US010230597B2

(12) United States Patent
Parandehgheibi et al.

(10) Patent No.: US 10,230,597 B2
(45) Date of Patent: Mar. 12, 2019

(54) OPTIMIZATIONS FOR APPLICATION DEPENDENCY MAPPING

(71) Applicant: Cisco Technology, Inc., San Jose, CA (US)

(72) Inventors: Ali Parandehgheibi, Sunnyvale, CA (US); Mohammadreza Alizadeh Attar, Cambridge, MA (US); Omid Madani, San Jose, CA (US); Vimalkumar Jeyakumar, Sunnyvale, CA (US); Ellen Christine Scheib, Mountain View, CA (US); Navindra Yadav, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 15/174,032

(22) Filed: Jun. 6, 2016

(65) Prior Publication Data
US 2016/0359705 A1 Dec. 8, 2016

Related U.S. Application Data

(60) Provisional application No. 62/171,899, filed on Jun. 5, 2015.

(51) Int. Cl.
G06F 15/167 (2006.01)
H04L 12/26 (2006.01)
(Continued)

(52) U.S. Cl.
CPC .......... H04L 43/045 (2013.01); G06F 3/0482 (2013.01); G06F 3/04842 (2013.01);
(Continued)

(58) Field of Classification Search
CPC .................................................... H04L 43/045
See application file for complete search history.

(56) References Cited

U.S. PATENT DOCUMENTS 5,086,385 A  2/1992 Launey et al.
5,319,754 A  6/1994 Meinecke et al.
(Continued)

FOREIGN PATENT DOCUMENTS

CN  101093452   12/2007
CN  101770551   7/2010
(Continued)

OTHER PUBLICATIONS

Natarajan, Arun et al., "NSDMiner: Automated Discovery of Network Service Dependencies," Institute of Electrical and Electronics Engineers INFOCOM, Feb. 2012.
(Continued)

Primary Examiner — Chris Parry
Assistant Examiner — Stephen J Houlihan
(74) Attorney, Agent, or Firm — Polsinelli PC

(57) ABSTRACT

Application dependency mapping can be automated in a network. The network can capture traffic data for flows passing through the network using a sensor network that provides multiple perspectives for the traffic. The network can analyze the traffic data to identify endpoints of the network. The network can also identify particular network configurations from the traffic data, such as a load balancing schema or a subnetting schema. The network can partition the endpoints based on the network configuration(s) and perform similarity measurements of endpoints in each partition to determine clusters of each partition. The clusters can make up nodes of an application dependency map, and relationships between and among the clusters can make up edges of the application dependency map.

20 Claims, 8 Drawing Sheets

(51) Int. Cl.

| | |
|---|---|
| H04L 29/06 | (2006.01) |
| G06F 9/455 | (2018.01) |
| G06F 17/30 | (2006.01) |
| H04L 12/851 | (2013.01) |
| H04L 12/24 | (2006.01) |
| H04W 84/18 | (2009.01) |
| H04L 29/08 | (2006.01) |
| G06N 99/00 | (2019.01) |
| G06F 21/53 | (2013.01) |
| H04L 12/723 | (2013.01) |
| G06F 3/0484 | (2013.01) |
| H04L 1/24 | (2006.01) |
| H04W 72/08 | (2009.01) |
| H04L 9/08 | (2006.01) |
| H04L 9/32 | (2006.01) |
| H04J 3/06 | (2006.01) |
| H04J 3/14 | (2006.01) |
| H04L 29/12 | (2006.01) |
| H04L 12/813 | (2013.01) |
| H04L 12/823 | (2013.01) |
| H04L 12/801 | (2013.01) |
| H04L 12/741 | (2013.01) |
| H04L 12/833 | (2013.01) |
| H04L 12/721 | (2013.01) |
| G06F 3/0482 | (2013.01) |
| G06T 11/20 | (2006.01) |
| H04L 12/841 | (2013.01) |
| H04L 12/725 | (2013.01) |
| H04L 12/715 | (2013.01) |
| G06F 21/55 | (2013.01) |
| G06F 21/56 | (2013.01) |

(52) U.S. Cl.
CPC ...... *G06F 3/04847* (2013.01); *G06F 9/45558* (2013.01); *G06F 17/3053* (2013.01); *G06F 17/30241* (2013.01); *G06F 17/30554* (2013.01); *G06F 17/30598* (2013.01); *G06F 17/30604* (2013.01); *G06F 17/30867* (2013.01); *G06F 21/53* (2013.01); *G06F 21/552* (2013.01); *G06F 21/566* (2013.01); *G06N 99/005* (2013.01); *G06T 11/206* (2013.01); *H04J 3/0661* (2013.01); *H04J 3/14* (2013.01); *H04L 1/242* (2013.01); *H04L 9/0866* (2013.01); *H04L 9/3239* (2013.01); *H04L 9/3242* (2013.01); *H04L 41/046* (2013.01); *H04L 41/0668* (2013.01); *H04L 41/0803* (2013.01); *H04L 41/0806* (2013.01); *H04L 41/0816* (2013.01); *H04L 41/0893* (2013.01); *H04L 41/12* (2013.01); *H04L 41/16* (2013.01); *H04L 41/22* (2013.01); *H04L 43/02* (2013.01); *H04L 43/04* (2013.01); *H04L 43/062* (2013.01); *H04L 43/08* (2013.01); *H04L 43/0805* (2013.01); *H04L 43/0811* (2013.01); *H04L 43/0829* (2013.01); *H04L 43/0841* (2013.01); *H04L 43/0858* (2013.01); *H04L 43/0864* (2013.01); *H04L 43/0876* (2013.01); *H04L 43/0882* (2013.01); *H04L 43/0888* (2013.01); *H04L 43/10* (2013.01); *H04L 43/106* (2013.01); *H04L 43/12* (2013.01); *H04L 43/16* (2013.01); *H04L 45/306* (2013.01); *H04L 45/38* (2013.01); *H04L 45/46* (2013.01); *H04L 45/507* (2013.01); *H04L 45/66* (2013.01); *H04L 45/74* (2013.01); *H04L 47/11* (2013.01); *H04L 47/20* (2013.01); *H04L 47/2441* (2013.01); *H04L 47/2483* (2013.01); *H04L 47/28* (2013.01); *H04L 47/31* (2013.01); *H04L 47/32* (2013.01); *H04L 61/2007* (2013.01); *H04L 63/0227* (2013.01); *H04L 63/0263* (2013.01); *H04L 63/06* (2013.01); *H04L 63/0876* (2013.01); *H04L 63/145* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/1458* (2013.01); *H04L 63/1466* (2013.01); *H04L 63/16* (2013.01); *H04L 63/20* (2013.01); *H04L 67/10* (2013.01); *H04L 67/1002* (2013.01); *H04L 67/12* (2013.01); *H04L 67/16* (2013.01); *H04L 67/36* (2013.01); *H04L 67/42* (2013.01); *H04L 69/16* (2013.01); *H04L 69/22* (2013.01); *H04W 72/08* (2013.01); *H04W 84/18* (2013.01); *G06F 2009/4557* (2013.01); *G06F 2009/45587* (2013.01); *G06F 2009/45591* (2013.01); *G06F 2009/45595* (2013.01); *G06F 2221/033* (2013.01); *G06F 2221/2101* (2013.01); *G06F 2221/2105* (2013.01); *G06F 2221/2111* (2013.01); *G06F 2221/2115* (2013.01); *G06F 2221/2145* (2013.01); *H04L 67/22* (2013.01)

(56) References Cited

U.S. PATENT DOCUMENTS

| | | |
|---|---|---|
| 5,400,246 A | 3/1995 | Wilson et al. |
| 5,436,909 A | 7/1995 | Dev et al. |
| 5,555,416 A | 9/1996 | Owens et al. |
| 5,726,644 A | 3/1998 | Jednacz et al. |
| 5,742,829 A | 4/1998 | Davis et al. |
| 5,831,848 A | 11/1998 | Rielly et al. |
| 5,903,545 A | 5/1999 | Sabourin et al. |
| 6,012,096 A | 1/2000 | Link et al. |
| 6,141,595 A | 10/2000 | Gloudeman et al. |
| 6,144,962 A | 11/2000 | Weinberg et al. |
| 6,239,699 B1 | 5/2001 | Ronnen |
| 6,247,058 B1 | 6/2001 | Miller et al. |
| 6,249,241 B1 | 6/2001 | Jordan et al. |
| 6,330,562 B1 | 12/2001 | Boden et al. |
| 6,353,775 B1 | 3/2002 | Nichols |
| 6,525,658 B2 | 2/2003 | Streetman et al. |
| 6,611,896 B1 | 8/2003 | Mason, Jr. et al. |
| 6,654,750 B1 | 11/2003 | Adams et al. |
| 6,728,779 B1 | 4/2004 | Griffin et al. |
| 6,801,878 B1 | 10/2004 | Hintz et al. |
| 6,816,461 B1 | 11/2004 | Scrandis et al. |
| 6,847,993 B1 | 1/2005 | Novaes et al. |
| 6,848,106 B1 | 1/2005 | Hipp |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 6,999,452 B1 | 2/2006 | Drummond-Murray et al. |
| 7,002,464 B2 | 2/2006 | Bruemmer et al. |
| 7,111,055 B2 | 9/2006 | Falkner |
| 7,120,934 B2 | 10/2006 | Ishikawa |
| 7,181,769 B1 | 2/2007 | Keanini et al. |
| 7,185,103 B1 | 2/2007 | Jain |
| 7,203,740 B1 | 4/2007 | Putzolu et al. |
| 7,302,487 B2 | 11/2007 | Ylonen et al. |
| 7,349,761 B1 | 3/2008 | Cruse |
| 7,353,511 B1 | 4/2008 | Ziese |
| 7,356,679 B1 | 4/2008 | Le et al. |
| 7,360,072 B1 | 4/2008 | Soltis et al. |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |

(56) References Cited

U.S. PATENT DOCUMENTS

| | | |
|---|---|---|
| 7,496,575 B2 | 2/2009 | Buccella et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,610,330 B1 | 10/2009 | Quinn et al. |
| 7,633,942 B2 | 12/2009 | Bearden et al. |
| 7,644,438 B1 | 1/2010 | Dash et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,743,242 B2 | 6/2010 | Oberhaus et al. |
| 7,752,307 B2 | 7/2010 | Takara |
| 7,783,457 B2 | 8/2010 | Cunningham |
| 7,787,480 B1 | 8/2010 | Mehta et al. |
| 7,788,477 B1 | 8/2010 | Huang et al. |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,873,074 B1 | 1/2011 | Boland |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,115,617 B2 | 2/2012 | Thubert et al. |
| 8,135,657 B2 | 3/2012 | Kapoor et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,185,824 B1 | 5/2012 | Mitchell et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,516,590 B1 | 8/2013 | Ranadive et al. |
| 8,527,977 B1 | 9/2013 | Cheng et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,588,081 B2 | 11/2013 | Salam et al. |
| 8,600,726 B1 | 12/2013 | Varshney et al. |
| 8,615,803 B2 | 12/2013 | Dacier et al. |
| 8,630,316 B2 | 1/2014 | Haba |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,775,577 B1 | 7/2014 | Alford et al. |
| 8,776,180 B2 | 7/2014 | Kumar et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,931,043 B2 | 1/2015 | Cooper et al. |
| 8,954,610 B2 | 2/2015 | Berke et al. |
| 8,966,021 B1 | 2/2015 | Allen |
| 8,973,147 B2 | 3/2015 | Pearcy et al. |
| 8,990,386 B2 | 3/2015 | He et al. |
| 8,996,695 B2 | 3/2015 | Anderson et al. |
| 8,997,227 B1 | 3/2015 | Mhatre et al. |
| 9,014,047 B2 | 4/2015 | Alcala et al. |
| 9,015,716 B2 | 4/2015 | Fletcher et al. |
| 9,071,575 B2 | 6/2015 | Lemaster et al. |
| 9,088,598 B1* | 7/2015 | Zhang ................. H04L 63/1408 |
| 9,110,905 B2 | 8/2015 | Polley et al. |
| 9,130,836 B2 | 9/2015 | Kapadia et al. |
| 9,160,764 B2 | 10/2015 | Stiansen et al. |
| 9,178,906 B1 | 11/2015 | Chen et al. |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,253,042 B2 | 2/2016 | Lumezanu et al. |
| 9,258,217 B2 | 2/2016 | Duffield et al. |
| 9,281,940 B2 | 3/2016 | Matsuda et al. |
| 9,286,047 B1 | 3/2016 | Avramov et al. |
| 9,317,574 B1 | 4/2016 | Brisebois et al. |
| 9,319,384 B2 | 4/2016 | Yan et al. |
| 9,369,435 B2 | 6/2016 | Short et al. |
| 9,378,068 B2 | 6/2016 | Anantharam et al. |
| 9,405,903 B1 | 8/2016 | Xie et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,501,744 B1 | 11/2016 | Brisebois, et al. |
| 9,531,589 B2 | 12/2016 | Clemm et al. |
| 9,563,517 B1 | 2/2017 | Natanzon et al. |
| 9,634,915 B2 | 4/2017 | Bley |
| 9,645,892 B1 | 5/2017 | Patwardhan |
| 9,684,453 B2 | 6/2017 | Holt et al. |
| 9,697,033 B2 | 7/2017 | Koponen et al. |
| 9,733,973 B2 | 8/2017 | Prasad et al. |
| 9,749,145 B2 | 8/2017 | Banavalikar et al. |
| 9,800,608 B2 | 10/2017 | Korsunsky et al. |
| 9,904,584 B2 | 2/2018 | Konig et al. |
| 2001/0028646 A1 | 10/2001 | Arts et al. |
| 2002/0053033 A1 | 5/2002 | Cooper et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0141343 A1 | 10/2002 | Bays |
| 2002/0184393 A1 | 12/2002 | Leddy et al. |
| 2003/0023601 A1 | 1/2003 | Fortier, Jr. et al. |
| 2003/0065986 A1 | 4/2003 | Fraenkel et al. |
| 2003/0097439 A1 | 5/2003 | Strayer et al. |
| 2003/0126242 A1 | 7/2003 | Chang |
| 2003/0145232 A1 | 7/2003 | Poletto et al. |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2004/0019676 A1 | 1/2004 | Iwatsuki et al. |
| 2004/0030776 A1 | 2/2004 | Cantrell et al. |
| 2004/0213221 A1 | 10/2004 | Civanlar et al. |
| 2004/0243533 A1 | 12/2004 | Dempster et al. |

(56) References Cited

U.S. PATENT DOCUMENTS

| | | | |
|---|---|---|---|
| 2004/0255050 A1 | 12/2004 | Takehiro et al. | |
| 2004/0268149 A1 | 12/2004 | Aaron | |
| 2005/0028154 A1 | 2/2005 | Smith et al. | |
| 2005/0039104 A1 | 2/2005 | Shah et al. | |
| 2005/0063377 A1 | 3/2005 | Bryant et al. | |
| 2005/0083933 A1 | 4/2005 | Fine et al. | |
| 2005/0108331 A1 | 5/2005 | Osterman | |
| 2005/0166066 A1 | 7/2005 | Ahuja et al. | |
| 2005/0177829 A1 | 8/2005 | Vishwanath | |
| 2005/0198247 A1 | 9/2005 | Perry et al. | |
| 2005/0198371 A1 | 9/2005 | Smith et al. | |
| 2005/0198629 A1 | 9/2005 | Vishwanath | |
| 2005/0207376 A1 | 9/2005 | Ashwood-Smith et al. | |
| 2005/0257244 A1* | 11/2005 | Joly | G06F 21/604 726/1 |
| 2005/0289244 A1 | 12/2005 | Sahu et al. | |
| 2006/0048218 A1 | 3/2006 | Lingafelt et al. | |
| 2006/0077909 A1 | 4/2006 | Saleh et al. | |
| 2006/0080733 A1 | 4/2006 | Khosmood et al. | |
| 2006/0095968 A1 | 5/2006 | Portolani et al. | |
| 2006/0143432 A1 | 6/2006 | Rothman et al. | |
| 2006/0156408 A1 | 7/2006 | Himberger et al. | |
| 2006/0159032 A1 | 7/2006 | Ukrainetz et al. | |
| 2006/0173912 A1 | 8/2006 | Lindvall et al. | |
| 2006/0195448 A1 | 8/2006 | Newport | |
| 2006/0272018 A1 | 11/2006 | Fouant | |
| 2006/0274659 A1 | 12/2006 | Ouderkirk | |
| 2006/0280179 A1 | 12/2006 | Meier | |
| 2006/0294219 A1 | 12/2006 | Ogawa et al. | |
| 2007/0025306 A1 | 2/2007 | Cox et al. | |
| 2007/0044147 A1 | 2/2007 | Choi et al. | |
| 2007/0097976 A1 | 5/2007 | Wood et al. | |
| 2007/0118654 A1 | 5/2007 | Jamkhedkar et al. | |
| 2007/0127491 A1 | 6/2007 | Verzijp et al. | |
| 2007/0162420 A1 | 7/2007 | Ou et al. | |
| 2007/0169179 A1 | 7/2007 | Narad | |
| 2007/0195729 A1 | 8/2007 | Li et al. | |
| 2007/0195794 A1 | 8/2007 | Fujita et al. | |
| 2007/0201474 A1 | 8/2007 | Isobe | |
| 2007/0211637 A1 | 9/2007 | Mitchell | |
| 2007/0214348 A1 | 9/2007 | Danielsen | |
| 2007/0230415 A1 | 10/2007 | Malik | |
| 2007/0250930 A1 | 10/2007 | Aziz et al. | |
| 2007/0300061 A1 | 12/2007 | Kim et al. | |
| 2008/0022385 A1 | 1/2008 | Crowell et al. | |
| 2008/0046708 A1 | 2/2008 | Fitzgerald et al. | |
| 2008/0082662 A1 | 4/2008 | Danliker et al. | |
| 2008/0101234 A1 | 5/2008 | Nakil et al. | |
| 2008/0120350 A1 | 5/2008 | Grabowski et al. | |
| 2008/0126534 A1 | 5/2008 | Mueller et al. | |
| 2008/0155245 A1 | 6/2008 | Lipscombe et al. | |
| 2008/0250122 A1* | 10/2008 | Zsigmond | H04L 67/34 709/220 |
| 2008/0270199 A1 | 10/2008 | Chess et al. | |
| 2008/0295163 A1 | 11/2008 | Kang | |
| 2008/0301765 A1 | 12/2008 | Nicol et al. | |
| 2009/0059934 A1 | 3/2009 | Aggarwal et al. | |
| 2009/0064332 A1 | 3/2009 | Porras et al. | |
| 2009/0241170 A1 | 9/2009 | Kumar et al. | |
| 2009/0300180 A1 | 12/2009 | Dehaan et al. | |
| 2009/0307753 A1 | 12/2009 | Dupont et al. | |
| 2009/0313373 A1 | 12/2009 | Hanna et al. | |
| 2009/0313698 A1 | 12/2009 | Wahl | |
| 2009/0328219 A1 | 12/2009 | Narayanaswamy | |
| 2010/0005288 A1 | 1/2010 | Rao et al. | |
| 2010/0049839 A1 | 2/2010 | Parker et al. | |
| 2010/0077445 A1 | 3/2010 | Schneider et al. | |
| 2010/0095293 A1 | 4/2010 | O'Neill et al. | |
| 2010/0095367 A1 | 4/2010 | Narayanaswamy | |
| 2010/0095377 A1 | 4/2010 | Krywaniuk | |
| 2010/0138526 A1 | 6/2010 | DeHaan et al. | |
| 2010/0138810 A1 | 6/2010 | Komatsu et al. | |
| 2010/0148940 A1 | 6/2010 | Gelvin et al. | |
| 2010/0153316 A1 | 6/2010 | Duffield et al. | |
| 2010/0153696 A1 | 6/2010 | Beachem et al. | |
| 2010/0180016 A1 | 7/2010 | Bugwadia et al. | |
| 2010/0220584 A1 | 9/2010 | DeHaan et al. | |
| 2010/0235514 A1 | 9/2010 | Beachem | |
| 2010/0235879 A1 | 9/2010 | Burnside et al. | |
| 2010/0235915 A1 | 9/2010 | Memon et al. | |
| 2010/0287266 A1 | 11/2010 | Asati et al. | |
| 2010/0303240 A1 | 12/2010 | Beachem | |
| 2010/0319060 A1 | 12/2010 | Aiken et al. | |
| 2011/0010585 A1 | 1/2011 | Bugenhagen et al. | |
| 2011/0022641 A1 | 1/2011 | Werth et al. | |
| 2011/0055381 A1 | 3/2011 | Narasimhan et al. | |
| 2011/0055388 A1 | 3/2011 | Yumerefendi et al. | |
| 2011/0066719 A1 | 3/2011 | Miryanov et al. | |
| 2011/0069685 A1 | 3/2011 | Tofighbakhsh | |
| 2011/0083125 A1 | 4/2011 | Komatsu et al. | |
| 2011/0103259 A1 | 5/2011 | Aybay et al. | |
| 2011/0107074 A1 | 5/2011 | Chan et al. | |
| 2011/0107331 A1 | 5/2011 | Evans et al. | |
| 2011/0126136 A1 | 5/2011 | Abella et al. | |
| 2011/0126275 A1 | 5/2011 | Anderson et al. | |
| 2011/0145885 A1 | 6/2011 | Rivers et al. | |
| 2011/0153811 A1 | 6/2011 | Jeong et al. | |
| 2011/0158088 A1 | 6/2011 | Lofstrand et al. | |
| 2011/0170860 A1 | 7/2011 | Smith et al. | |
| 2011/0173490 A1 | 7/2011 | Narayanaswamy et al. | |
| 2011/0185423 A1 | 7/2011 | Sallam | |
| 2011/0196957 A1 | 8/2011 | Ayachitula et al. | |
| 2011/0202655 A1 | 8/2011 | Sharma et al. | |
| 2011/0214174 A1 | 9/2011 | Herzog et al. | |
| 2011/0225207 A1 | 9/2011 | Subramanian et al. | |
| 2011/0228696 A1 | 9/2011 | Agarwal et al. | |
| 2011/0246663 A1 | 10/2011 | Melsen et al. | |
| 2011/0277034 A1 | 11/2011 | Hanson | |
| 2011/0302652 A1 | 12/2011 | Westerfeld | |
| 2011/0314148 A1 | 12/2011 | Petersen et al. | |
| 2012/0005542 A1 | 1/2012 | Petersen et al. | |
| 2012/0079592 A1 | 3/2012 | Pandrangi | |
| 2012/0089664 A1 | 4/2012 | Igelka | |
| 2012/0102361 A1 | 4/2012 | Sass et al. | |
| 2012/0102543 A1 | 4/2012 | Kohli et al. | |
| 2012/0117226 A1 | 5/2012 | Tanaka et al. | |
| 2012/0136996 A1 | 5/2012 | Seo et al. | |
| 2012/0137278 A1 | 5/2012 | Draper et al. | |
| 2012/0137361 A1 | 5/2012 | Yi et al. | |
| 2012/0140626 A1 | 6/2012 | Anand et al. | |
| 2012/0195198 A1 | 8/2012 | Regan | |
| 2012/0197856 A1 | 8/2012 | Banka et al. | |
| 2012/0198541 A1 | 8/2012 | Reeves | |
| 2012/0216271 A1 | 8/2012 | Cooper et al. | |
| 2012/0218989 A1 | 8/2012 | Tanabe et al. | |
| 2012/0219004 A1 | 8/2012 | Balus et al. | |
| 2012/0233348 A1 | 9/2012 | Winters | |
| 2012/0233473 A1 | 9/2012 | Vasseur et al. | |
| 2012/0240232 A1 | 9/2012 | Azuma | |
| 2012/0246303 A1 | 9/2012 | Petersen et al. | |
| 2012/0254109 A1 | 10/2012 | Shukla et al. | |
| 2012/0260227 A1 | 10/2012 | Shukla et al. | |
| 2012/0278021 A1 | 11/2012 | Lin et al. | |
| 2012/0281700 A1 | 11/2012 | Koganti et al. | |
| 2013/0003538 A1 | 1/2013 | Greenburg et al. | |
| 2013/0003733 A1 | 1/2013 | Venkatesan et al. | |
| 2013/0006935 A1* | 1/2013 | Grisby | G06F 17/30563 707/635 |
| 2013/0007435 A1 | 1/2013 | Bayani | |
| 2013/0038358 A1 | 2/2013 | Cook et al. | |
| 2013/0086272 A1 | 4/2013 | Chen et al. | |
| 2013/0103827 A1 | 4/2013 | Dunlap et al. | |
| 2013/0107709 A1 | 5/2013 | Campbell et al. | |
| 2013/0124807 A1 | 5/2013 | Nielsen et al. | |
| 2013/0125107 A1 | 5/2013 | Bandakka et al. | |
| 2013/0145099 A1 | 6/2013 | Liu et al. | |
| 2013/0148663 A1 | 6/2013 | Xiong | |
| 2013/0159999 A1 | 6/2013 | Chiueh et al. | |
| 2013/0174256 A1 | 7/2013 | Powers | |
| 2013/0179487 A1 | 7/2013 | Lubetzky et al. | |
| 2013/0179879 A1 | 7/2013 | Zhang et al. | |
| 2013/0198839 A1 | 8/2013 | Wei et al. | |
| 2013/0201986 A1 | 8/2013 | Sajassi et al. | |
| 2013/0205293 A1 | 8/2013 | Levijarvi et al. | |

(56) References Cited

U.S. PATENT DOCUMENTS

| | | |
|---|---|---|
| 2013/0219161 A1 | 8/2013 | Fontignie et al. |
| 2013/0232498 A1 | 9/2013 | Mangtani et al. |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0336164 A1 | 12/2013 | Yang et al. |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0019972 A1 | 1/2014 | Yahalom et al. |
| 2014/0033193 A1 | 1/2014 | Palaniappan |
| 2014/0040343 A1 | 2/2014 | Nickolov et al. |
| 2014/0047185 A1 | 2/2014 | Peterson et al. |
| 2014/0047372 A1 | 2/2014 | Gnezdov et al. |
| 2014/0059200 A1 | 2/2014 | Nguyen et al. |
| 2014/0074946 A1 | 3/2014 | Dirstine et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0137109 A1 | 5/2014 | Sharma et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0280499 A1 | 9/2014 | Basavaiah et al. |
| 2014/0281030 A1 | 9/2014 | Cui et al. |
| 2014/0286354 A1 | 9/2014 | Van De Poel et al. |
| 2014/0289854 A1 | 9/2014 | Mahvi |
| 2014/0298461 A1 | 10/2014 | Hohndel et al. |
| 2014/0317278 A1 | 10/2014 | Kersch et al. |
| 2014/0317737 A1 | 10/2014 | Shin et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006714 A1 | 1/2015 | Jain |
| 2015/0009840 A1 | 1/2015 | Pruthi et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0058976 A1 | 2/2015 | Carney et al. |
| 2015/0067143 A1 | 3/2015 | Babakhan et al. |
| 2015/0082151 A1 | 3/2015 | Liang et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0222939 A1 | 8/2015 | Gallant et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271008 A1 | 9/2015 | Jain et al. |
| 2015/0271255 A1 | 9/2015 | Mackay et al. |
| 2015/0295945 A1 | 10/2015 | Canzanese, Jr. et al. |
| 2015/0347554 A1 | 12/2015 | Vasantham et al. |
| 2015/0358352 A1 | 12/2015 | Chasin et al. |
| 2016/0006753 A1 | 1/2016 | McDaid et al. |
| 2016/0019030 A1 | 1/2016 | Shukla et al. |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0103692 A1 | 4/2016 | Guntaka et al. |
| 2016/0105350 A1 | 4/2016 | Greifeneder et al. |
| 2016/0112270 A1* | 4/2016 | Danait .................. H04L 41/142 709/220 |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0269442 A1 | 9/2016 | Shieh |
| 2016/0269482 A1 | 9/2016 | Jamjoom et al. |
| 2016/0294691 A1 | 10/2016 | Joshi |
| 2016/0308908 A1 | 10/2016 | Kirby et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |

(56) References Cited

U.S. PATENT DOCUMENTS

| | | |
|---|---|---|
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2017/0024453 A1 | 1/2017 | Raja et al. |
| 2017/0034018 A1 | 2/2017 | Parasdehgheibi et al. |
| 2017/0048121 A1 | 2/2017 | Hobbs et al. |
| 2017/0070582 A1 | 3/2017 | Desai et al. |
| 2017/0085483 A1 | 3/2017 | Mihaly et al. |
| 2017/0208487 A1 | 7/2017 | Ratakonda et al. |
| 2017/0250880 A1 | 8/2017 | Akens et al. |
| 2017/0250951 A1 | 8/2017 | Wang et al. |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0145906 A1 | 5/2018 | Yadav |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2860912 | 4/2015 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2016/004075 | 1/2016 |
| WO | WO 2016/019523 | 2/2016 |

OTHER PUBLICATIONS

Popa, Lucian et al., "Macroscope: End-Point Approach to Networked Application Dependency Discovery," Conference on Emerging Network Experiment and Technology, 2009.

Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.

Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.

Backes, Michael, et al., "Data Lineage in Malicious Environments," IEEE 2015, pp. 1-13.

Bayati, Mohsen, et al., "Message-Passing Algorithms for Sparse Network Alignment," Mar. 2013, 31 pages.

Berezinski, Przemyslaw, et al., "An Entropy-Based Network Anomaly Detection Method," Entropy, 2015, vol. 17, www.mdpi.com/journal/entropy, pp. 2367-2408.

Berthier, Robin, et al. "Nfsight: Netflow-based Network Awareness Tool," 2010, 16 pages.

Bhuyan, Dhiraj, "Fighting Bots and Botnets," 2006, pp. 23-28.

Blair, Dana, et al., U.S. Appl. No. 62/106,006, filed Jan. 21, 2015, entitled "Monitoring Network Policy Compliance."

Chandran, Midhun, et al., "Monitoring in a Virtualized Environment," GSTF International Journal on Computing, vol. 1, No. 1, Aug. 2010.

Cisco Systems, Inc., "Addressing Compliance from One Infrastructure: Cisco Unified Compliance Solution Framework," 2014.

Cisco Systems, Inc., "Cisco Application Dependency Mapping Service," 2009.

Cisco Systems, Inc., "White Paper—New Cisco Technologies Help Customers Achieve Regulatory Compliance," 1992-2008.

Cisco Systems, Inc., "A Cisco Guide to Defending Against Distributed Denial of Service Attacks," May 3, 2016, 34 pages.

Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.

Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.

Feinstein, Laura, et al., "Statistical Approaches to DDoS Attack Detection and Response," Proceedings of the DARPA Information Survivability Conference and Exposition (DISCEX '03), Apr. 2003, 12 pages.

George, Ashley, et al., "NetPal: A Dynamic Network Administration Knowledge Base," 2008, pp. 1-14.

Goldsteen, Abigail, et al., "A Tool for Monitoring and Maintaining System Trustworthiness at Run Time," REFSQ (2015), pp. 142-147.

Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.

Hewlett-Packard, "Effective use of reputation intelligence in a security operations center," Jul. 2013, 6 pages.

Hideshima, Yusuke, et al., "STARMINE: A Visualization System for Cyber Attacks," https://www.researchgate.net/publication/221536306, Feb. 2006, 9 pages.

InternetPerils, Inc., "Control Your Internet Business Risk," 2003-2015, https://www.internetperils.com.

Janoff, Christian, et al., "Cisco Compliance Solution for HIPAA Security Rule Design and Implementation Guide," Cisco Systems, Inc., Updated Nov. 14, 2015, part 1 of 2, 350 pages.

Janoff, Christian, et al., "Cisco Compliance Solution for HIPAA Security Rule Design and Implementation Guide," Cisco Systems, Inc., Updated Nov. 14, 2015, part 2 of 2, 588 pages.

Kerrison, Adam, et al., "Four Steps to Faster, Better Application Dependency Mapping—Laying the Foundation for Effective Business Service Models," BMCSoftware, 2011.

Kraemer, Brian, "Get to know your data center with CMDB," TechTarget, Apr. 5, 2006, http://searchdatacenter.techtarget.com/news/118820/Get-to-know-your-data-center-with-CMDB.

Lab SKU, "VMware Hands-on Labs—HOL-SDC-1301" Version: 20140321-160709, 2013; http://docs.hol.vmware.com/HOL-2013/holsdc-1301_html_en/ (part 1 of 2).

Lab SKU, "VMware Hands-on Labs—HOL-SDC-1301" Version: 20140321-160709, 2013; http://docs.hol.vmware.com/HOL-2013/holsdc-1301_html_en/ (part 2 of 2).

Lachance, Michael, "Dirty Little Secrets of Application Dependency Mapping," Dec. 26, 2007.

Landman, Yoav, et al., "Dependency Analyzer," Feb. 14, 2008, http://1frog.com/confluence/display/DA/Home.

Lee, Sihyung, "Reducing Complexity of Large-Scale Network Configuration Management," Ph.D. Dissertation, Carniege Mellon University, 2010.

Li, Ang, et al., "Fast Anomaly Detection for Large Data Centers," Global Telecommunications Conference (GLOBECOM 2010, Dec. 2010, 6 pages.

(56) References Cited

OTHER PUBLICATIONS

Li, Bingbong, et al, "A Supervised Machine Learning Approach to Classify Host Roles On Line Using sFlow," in Proceedings of the first edition workshop on High performance and programmable networking, 2013, ACM, New York, NY, USA, 53-60.

Liu, Ting, et al., "Impala: A Middleware System for Managing Autonomic, Parallel Sensor Systems," in Proceedings of the Ninth ACM SIGPLAN Symposium on Principles and Practice of Parallel Programming(PPoPP '03), ACM, New York, NY, USA, Jun. 11-13, 2003, pp. 107-118.

Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.

Matteson, Ryan, "Depmap: Dependency Mapping of Applications Using Operating System Events: a Thesis," Master's Thesis, California Polytechnic State University, Dec. 2010.

Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.

Neverfail, "Neverfail IT Continuity Architect," 2015, https://web.archive.org/web/20150908090456/http://www.neverfailgroup.com/products/it-continuity-architect.

Nilsson, Dennis K., et al., "Key Management and Secure Software Updates in Wireless Process Control Environments," in Proceedings of the First ACM Conference on Wireless Network Security (WiSec '08), ACM, New York, NY, USA, Mar. 31-Apr. 2, 2008, pp. 100-108.

Nunnally, Troy, et al., "P3D: A Parallel 3D Coordinate Visualization for Advanced Network Scans," IEEE 2013, Jun. 9-13, 2013, 6 pages.

O'Donnell, Glenn, et al., "The CMDB Imperative: How to Realize the Dream and Avoid the Nightmares," Prentice Hall, Feb. 19, 2009.

Ohta, Kohei, et al., "Detection, Defense, and Tracking of Internet-Wide Illegal Access in a Distributed Manner," 2000, pp. 1-16.

Pathway Systems International Inc., "How Blueprints does Integration," Apr. 15, 2014, 9 pages, http://pathwaysystems.com/company-blog/.

Pathway Systems International Inc., "What is Blueprints?" 2010-2016, http://pathwaysystems.com/blueprints-about/.

Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.

Sachan, Mrinmaya, et al., "Solving Electrical Networks to incorporate Supervision in Random Walks," May 13-17, 2013, pp. 109-110.

Sammarco, Matteo, et al., "Trace Selection for Improved WLAN Monitoring," Aug. 16, 2013, pp. 9-14.

Shneiderman, Ben, et al., "Network Visualization by Semantic Substrates," Visualization and Computer Graphics, vol. 12, No. 5, pp. 733,740, Sep.-Oct. 2006.

Wang, Ru, et al., "Learning directed acyclic graphs via bootstarp aggregating," 2014, 47 pages, http://arxiv.org/abs/1406.2098.

Wang, Yongjun, et al., "A Network Gene-Based Framework for Detecting Advanced Persistent Threats," Nov. 2014, 7 pages.

Woodberg, Brad, "Snippet from Juniper SRX Series" Jun. 17, 2013, 1 page, O'Reilly Media, Inc.

Zhang, Yue, et al., "CANTINA: A Content-Based Approach to Detecting Phishing Web Sites," May 8-12, 2007, pp. 639-648.

Bosch, Greg, "Virtualization," 2010, 33 pages.

Breen, Christopher, "Mac 911, How to dismiss Mac App Store Notifications," Macworld.com, Mar. 24, 2014, 3 pages.

Chou, C.W., et al., "Optical Clocks and Relativity," Science vol. 329, Sep. 24, 2010, pp. 1630-1633.

Huang, Hing-Jie, et al., "Clock Skew Based Node Identification in Wireless Sensor Networks," IEEE, 2008, 5 pages.

Ives, Herbert, E., et al., "An Experimental Study of the Rate of a Moving Atomic Clock," Journal of the Optical Society of America, vol. 28, No. 7, Jul. 1938, pp. 215-226.

Witze, Alexandra, "Special relativity aces time trial, 'Time dilation' predicted by Einstein confirmed by lithium ion experiment," Nature, Sep. 19, 2014, 3 pages.

Zatrochova, Zuzana, "Analysis and Testing of Distributed NoSQL Datastore Riak," Spring, 2015, 76 pages.

Bauch, Petr, "Reader's Report of Master's Thesis, Analysis and Testing of Distributed NoSQL Datastore Riak," May 28, 2015, Brno. 2 pages.

Heckman, Sarah, et al., "On Establishing a Benchmark for Evaluating Static Analysis Alert Prioritization and Classification Techniques," IEEE, 2008; 10 pages.

Kim, Myung-Sup, et al. "A Flow-based Method for Abnormal Network Traffic Detection," IEEE, 2004, pp. 599-612.

Thomas, R., "Bogon Dotted Decimal List," Version 7.0, Team Cymru NOC, Apr. 27, 2012, 5 pages.

Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.

Brocade Communications Systems, Inc., "Chapter 5—Configuring Virtual LANs (VLANs)," Jun. 2009, 38 pages.

Cisco Systems, Inc. "Cisco, Nexus 3000 Series NX-OS Release Notes, Release 5.0(3)U3(1)," Feb. 29, 2012, Part No. OL-26631-01, 16 pages.

Cisco Systems, Inc., "Cisco—VPN Client User Guide for Windows," Release 4.6, Aug. 2004, 148 pages.

Cisco Systems, Inc., "Cisco 4710 Application Control Engine Appliance Hardware Installation Guide," Nov. 2007, 66 pages.

Cisco Systems, Inc., "Cisco Data Center Network Architecture and Solutions Overview," Feb. 2006, 19 pages.

Cisco Systems, Inc., "Cisco IOS Configuration Fundamentals Configuration Guide: *Using Autoinstall and Setup*," Release 12.2, first published Apr. 2001, last updated Sep. 2003, 32 pages.

Cisco Systems, Inc., "Cisco VN-Link: Virtualization-Aware Networking," White Paper, Mar. 2009, 10 pages.

Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages.

Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.

Cisco Systems, Inc., "Quick Start Guide, Cisco ACE 4700 Series Application Control Engine Appliance," Software Ve740rsion A5(1.0), Sep. 2011, 138 pages.

Cisco Systems, Inc., "Routing and Bridging Guide, Cisco ACE Application Control Engine," Software Version A5(1.0), Sep. 2011, 248 pages.

Cisco Systems, Inc., "VMWare and Cisco Virtualization Solution: Scale Virtual Machine Networking," Jul. 2009, 4 pages.

Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.

Cisco Technology, Inc., "Cisco IOS Software Release 12.4T Features and Hardware Support," Feb. 2009, 174 pages.

Cisco Systems, Inc., "Cisco Application Control Engine (ACE) Troubleshooting Guide—Understanding the ACE Module Architecture and Traffic Flow," Mar. 11, 2011, 6 pages.

Costa, Raul, et al., "An Intelligent Alarm Management System for Large-Scale Telecommunication Companies," in Portuguese Conference on Artificial Intelligence, Oct. 2009, 14 pages.

De Carvalho, Tiago Filipe Rodrigues, "Root Cause Analysis in Large and Complex Networks," Dec. 2008, Repositorio.ul.pt, pp. 1-55.

Foundation for Intelligent Physical Agents, "FIPA Agent Message Transport Service Specification," Dec. 3, 2002, http://www.fipa.org; 15 pages.

Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable,

(56) References Cited

OTHER PUBLICATIONS

Autonomic and Secure Computing; Pervasive Intelligence and Computing, Oct. 26, 2015, pp. 356-363.
Joseph, Dilip, et al., "Modeling Middleboxes," IEEE Network, Sep./Oct. 2008, pp. 20-25.
Kent, S., et al. "Security Architecture for the Internet Protocol," Network Working Group, Nov. 1998, 67 pages.
Online Collins English Dictionary, 1 page (Year: 2018).
Voris, Jonathan, et al., "Bait and Snitch: Defending Computer Systems with Decoys," Columbia University Libraries, Department of Computer Science, 2013, pp. 1-25.

* cited by examiner

OPTIMIZATIONS FOR APPLICATION DEPENDENCY MAPPING

CROSS-REFERENCE TO RELATED APPLICATION

This application claims priority to U.S. Provisional Application 62/171,899, titled System for Monitoring and Managing Datacenters and filed at Jun. 5, 2015, the disclosure of which is incorporated herein by reference in its entirety.

TECHNICAL FIELD

The subject matter of this disclosure relates in general to the field of computer networks, and more specifically for discovering applications and their interdependencies within a computer network.

BACKGROUND

An enterprise application is a set of workloads (e.g., computing, networking, and storage) that is generally distributed across various endpoints of a network and the relationships (e.g., connectivity, dependencies, network and security policies, etc.) between the workloads. A typical application may include a presentation tier, an application tier, and a data tier. The presentation tier may depend on the application tier and authentication services, and the application tier may depend on the web tier and external network services (e.g., a travel reservation system, an ordering tool, a billing tool, etc.). These tiers may further depend on firewall, load balancing, wide area network (WAN) acceleration, and other network services. An enterprise can include hundreds or thousands of applications of similar and different architectures.

A thorough understanding of applications running in a network and their dependencies can be critical for administrative tasks such as troubleshooting system and network failures, asset management (e.g., capacity planning, consolidation, migration, and continuity planning), and anomaly detection. Despite the complexities of the interrelationships among workloads, traditional approaches for assessing applications and applications dependencies are often limited to manual processes that are customized for a particular enterprise and require highly expert human operators with vast knowledge of that enterprise's network.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
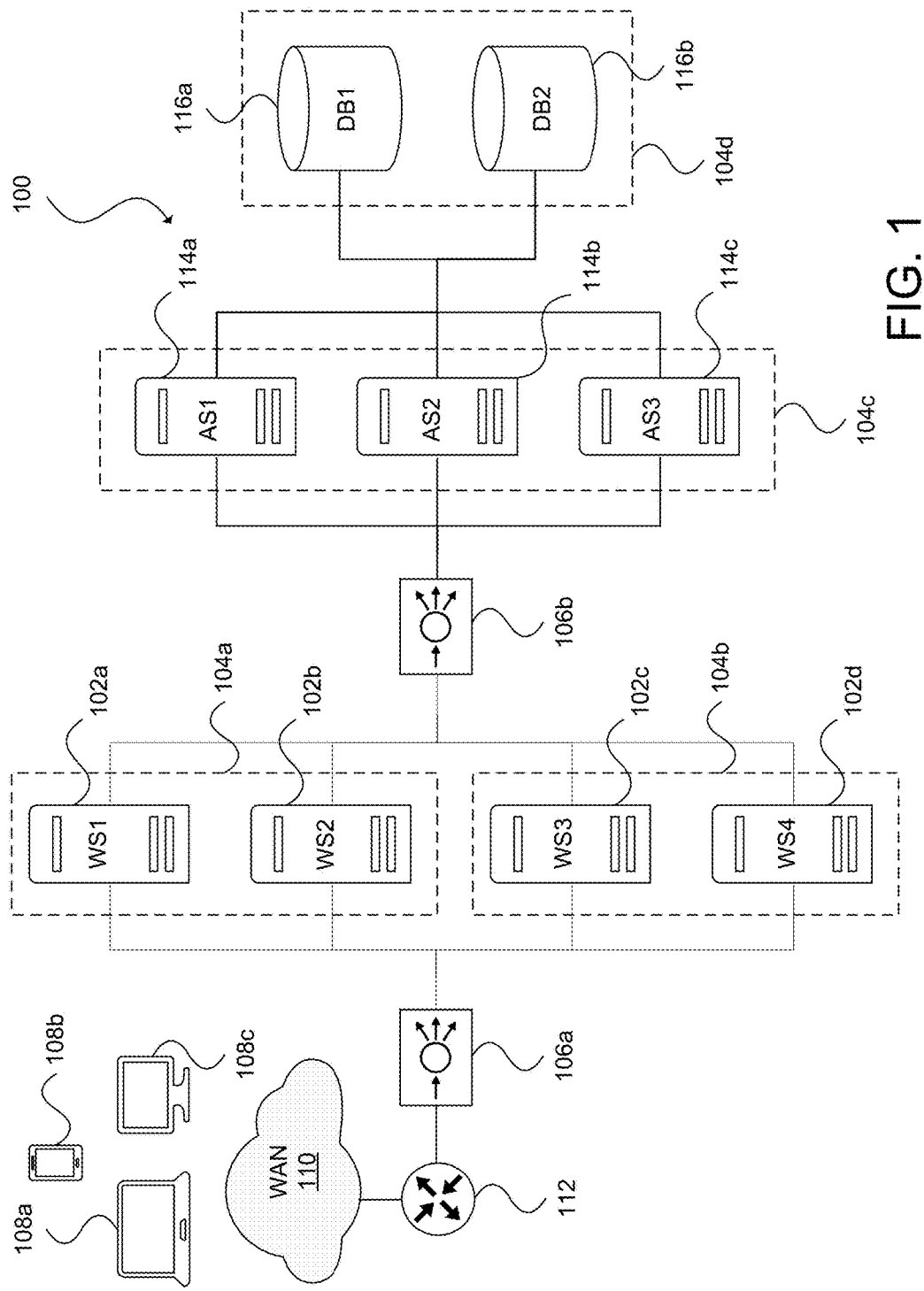
FIG. 1 illustrates an example of an enterprise application topology in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A network can be configured to automatically generate an application dependency map, a representation of applications running in the network and the applications' relationships between and among each other. The network can capture traffic data for flows passing through the network using a sensor network that provides multiple perspectives for the traffic. The sensor network can include sensors for networking devices (e.g., routers, switches, and network appliances), physical servers, hypervisors or container engines, and virtual partitions (e.g., virtual machines (VMs) or containers). The traffic data that can be captured can include packet attributes of a flow, host attributes or virtualization attributes of a source or a destination of the flow, process attributes of a process initiating the flow, and user attributes of a process owner. The network can analyze the traffic data to identify endpoints of the network. The network can also identify particular network configurations from the traffic data, such as a load balancing schema or a subnetting schema. The network can partition the endpoints based on the network configuration(s), and perform similarity computations of endpoints in each partition to determine clusters of each partition. The clusters can make up nodes of an application dependency map, and relationships between and among the clusters can make up edges of the application dependency map.

Description

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

Application dependency mapping (ADM) is the process of determining interrelationships between and among workloads in a network. An accurate and comprehensive ADM can provide network and security administrators several benefits, such as enabling administrators to efficiently locate and isolate sources of failure in a network, adequately prepare for changes to applications running in the network or changes to the network itself, and reliably maintain operation of the network free from attacks and failures. As discussed, conventional approaches for discovering applications and application dependencies are often manual procedures that must be performed by highly skilled network engineers with expansive knowledge and experience with their organizations' networks. Automating application dependency mapping, however, can be a difficult endeavor.

An integral task of application dependency mapping is clustering or identifying endpoints performing similar workloads, communicating with a similar set of endpoints or networking devices, having similar network and security limitations (i.e., policies), and sharing other attributes. Thus, clustering involves determining similarities between endpoints, which can be an $O(N^2)$ problem where 'N' is the number of endpoints in the network if an endpoint must be compared to every other endpoint in the network. Various approaches can be used to optimize the clustering process by reducing the problem into smaller subsets, such as by partitioning the endpoints based on particular network configurations.

Referring now to the drawings, FIG. 1 is an illustration of a logical view of an enterprise application 100 in accordance with an embodiment. The application 100 employs a three tier architecture that includes a presentation or web tier, an application or business logic tier, and a data or database tier. In this example, the presentation tier is made up of web servers 102a and 102b that are located on a first subnet 104a and web servers 102c and 102d that are located on a second subnet 104b. The web servers 102a, 102b, 102c, and 102d (collectively, "102") form a part of a server farm that receive connection requests from load balancer 106a according to a server load balancing (SLB) algorithm, such as weighted round robin or weighted least connections.

The weighted round robin algorithm specifies that the web server used for a new connection is chosen from the server farm in a circular fashion. Each web server 102 is assigned a weight, 'w,' that represents its capacity to handle connections, as compared to the other web servers. That is, new connections are assigned to a given web server 'w' times before the next web server in the server farm is chosen. For example, if 'w'=3 for the web server 102a, 'w'=1 for the web server 102b, 'w'=2 for the web server 102c, and 'w'=3 for the web server 102d, the first three connections to the load balancer 106a are assigned to the web server 102a, the fourth connection to the web server 102b, the fifth and sixth connections to the web server 102c, and the seventh, eighth, and ninth connections to the web server 102d.

The weighted least connections algorithm specifies that the next web server chosen from the server farm for a new connection is the server with the fewest number of active connections. Each web server 102 is also assigned a weight for this algorithm. When weights are assigned, the server with the fewest number of connections is based on the number of active connections on each server, and on the relative capacity of each server. The capacity of a given web server is calculated as the assigned weight of that server divided by the sum of the assigned weights of all of the web servers associated with that server farm, or $w_1/(w_1+w_2+w_3+\ldots w_n)$.

For example, if 'w'=3 for the web server 102a, 'w'=1 for the web server 102b, 'w'=2 for the web server 102c, and 'w'=2 for the web server 102d, then the web server 102a would have a calculated capacity of 3/(3+1+2+3), or a third of all active connections of the server farm, the web server 102b two-ninths of all active connections, the web-server 102c one-ninth of all active connections, and the web server 102d one third of all active connections. At any point in time, the next connection to the server farm would be assigned to the web server whose number of active connections is farthest below its calculated capacity.

The load balancer 106a receives connection requests from client devices 108a, 108b, and 108c (collectively, "108") via wide area network (WAN) 110 through router 112. The load balancer 106a may be implemented, for example, as a dedicated hardware device, software that can be run from virtual partitions (e.g., VMs or containers) of commodity computing devices, or software integrated within a network operating system, among other possibilities. The client devices 108 can be a server, desktop computer or workstation, laptop, tablet, desk phone, smartphone, wearable device, or other electronic device capable of communicating over a network. The WAN 110 can be a public network, such as the Internet, or a private network, such as to connect geographically disparate branches of an enterprise network.

The presentation tier of the application 100 is composed of application servers 114a, 114b, and 114c (collectively, "114") located on a third subnet 104c. The application servers 114 can provide business logic and other more robust processing need beyond serving webpage content. The application servers 114 can also increase network security by acting as an additional layer of insulation between the public-facing presentation tier and the data tier and other sensitive systems. The data tier is made up of databases 116a and 116b (collectively, "116") located on a fourth subnet 104d. In this example, the database 116a may be a primary or master database, and the database 116 may be a secondary or slave database for supporting high availability. The databases 116 may provide the presentation tier and the application tier persistent storage, such as for user data and application data. The application tier receives connection requests from the presentation tier through the load balancer 106b, and makes connection requests to the data tier directly. The load balancers 106a and 106b (collectively, "106") can have a similar or different configuration from each other.

Figure 2A:
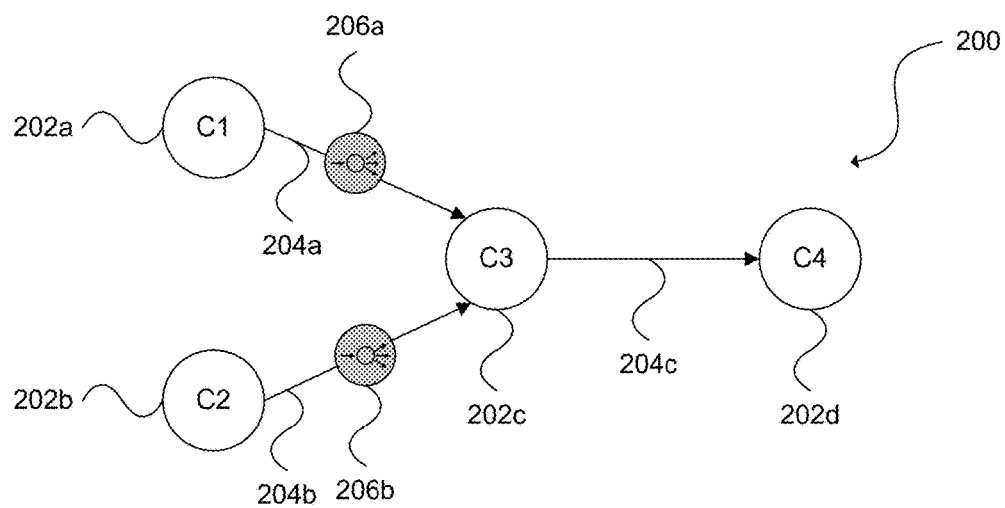
FIG. 2A and FIG. 2B illustrate examples of an application dependency map in accordance with an embodiment.
Figure 2B:
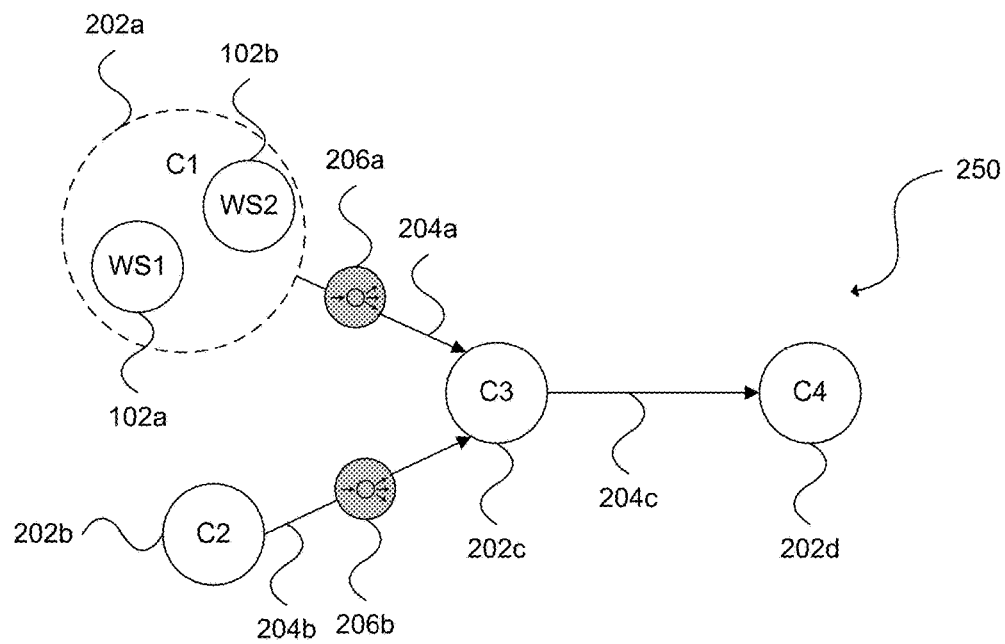

FIG. 2A and FIG. 2B illustrate examples of application dependency maps 200 and 250, respectively, in accordance with an embodiment. The application dependency maps 200 and 250 can be presented as a part of a graphical user interface (GUI) of a network traffic monitoring system that a network administrator, security administrator, or other user can utilize to visualize the applications running in their network and the relationships between and among the applications. In this example, the application dependency maps 200 and 250 are directed acyclic graphs that correspond to the application 100 of FIG. 1. Other application dependency maps may be cyclic, such as if components of an application have mutual dependencies or a first component has a dependency on a third component, and the third component has a dependency on the first component. Other application dependency maps may also be represented as undirected graphs, such as where there are bidirectional dependencies among all nodes of an application or where the direction of a dependency is not important to the user. Other representations of application dependencies may also be used in various embodiments, such as chord graphs, radial graphs, or other suitable visualization methods.

The nodes of the application dependency maps 200 and 250 comprise clusters 202a, 202b, 202c, and 202d that correspond to the web servers 102a and 102b, the web servers 102c and 102d, the application servers 114, and the databases 116, respectively. Edges 204a, 204b, and 204c (collectively, "204") indicate dependencies between and among the clusters 202 with the direction of an edge indicating the direction of the dependency. For example, the edge 204a indicates that the cluster 202a has a dependency on the cluster 202c, the edge 204b indicates that the cluster 202b has a dependency on the cluster 202c, and the edge 204c indicates that the cluster 202c has a dependency on the cluster 202d. That is, the web servers 102 depend on the application servers 114, which in turn depend on the databases 116 as to be expected from the three tier architecture of the application 100. Icons 206a and 206b indicate that the cluster 202a forms a first server farm and the cluster 202b form a second server farm that are load balanced by cluster 202c.

FIG. 2A can represent a default view of the application dependency map for the application 100, and FIG. 2B can represent a particular view of the application dependency map in which the cluster 202a has been "exploded" or selected by a user to display the members or endpoints of that cluster, the web servers 102a and 102b. In another embodiment, a GUI for the application dependency map can enable the user to toggle between a view of only the clusters (and individual endpoints) of the network and a view that displays all of the endpoints of a cluster such as the cluster 202a of FIG. 2B.

As discussed, determining clusters in the network requires similarity computations that can grow at a rate of $O(N^2)$ for the number of endpoints 'N' in a network if each endpoint of the network must be compared to every other endpoint of the network. Various embodiments optimize the clustering process by significantly reducing the number of necessary computations using certain heuristics regarding network configurations. For example, two servers that are load balanced must provide the same or substantially similar services to clients such that the servers form a cluster. Thus, in some embodiments, one or more server farms of one or more server load balancing (SLB) schemes can be identified in the network, and the servers or endpoints that make up a server farm can be labeled as a cluster. In some embodiments, a clustering process can filter out these labeled endpoints.

Various approaches can be utilized to identify SLB schemes in a network. In some embodiments, the clustering process can receive (or collect) SLB configuration data and use such data to identify and label SLB-based clusters. The SLB configuration data can be received from a network operating system that supports SLB (e.g., IOS® provided by Cisco® Systems, Inc. of San Jose, Calif.), a configuration management system (CMS) or configuration management database (CMDB), or similar tools. In some embodiments, where SLB configuration data is unavailable or where SLB configuration data is used to validate an automated clustering process, network traffic data (including packet data, host data, virtualization data, process data, user data, etc.) can be analyzed and patterns for a SLB server farm may be identified from the network traffic data. For example, similarities in traffic data, such as a request size, response size, IPv6 flow label, connection duration, virtual addressing, and other attributes may be indicative of endpoints being part of an SLB server farm. As another example, traffic patterns may correspond to a well-known SLB algorithm, such as the weighted round robin algorithm or the weighted least connections algorithm and the endpoints forming these traffic patterns may be identified as a member of the SLB server farm.

In some situations, there may be gaps in the SLB configuration data (e.g., misconfiguration or undocumented configuration) or traffic data (e.g., a specified period of time that may be too limited) such that the SLB filtering or partitioning process may fail to identify all members of a server farm. Thus, in some embodiments, a single feature vector can be calculated for a server farm from a composite of feature vectors of multiple endpoints of the server farm to ensure that the clustering process identifies other members of the server farm that were not identified during the SLB filtering or partitioning process.

In some embodiments, subnetting schemes in a network can also be used to optimize a clustering process. Clustered resources are generally located on a same subnet. Most applications require clustered resources to be on the same subnet. A limited number of applications may support clustering over different subnets, such as to provide failover of a first subnet to a second subnet. However, although a clustered server may keep the same network name after failover, if the clustered server fails over to a different subnet, the network name will become associated with a new IP address. DNS servers must update one another with this new IP address before clients can discover the clustered server that has failed over. In addition, clients must wait for cached DNS entries to expire before the clients may query a DNS server again. The amount of downtime that clients experience is untenable for enterprise applications. From these observations, a cluster can be defined such that endpoints in different subnets cannot belong to the same cluster. Thus, in some embodiments, a clustering process may limit similarity computations to endpoints in the same subnet and/or forego similarity computations for endpoints in different subnets. That is, the clustering process can partition endpoints of a network based on their subnet (or subnet mask), and perform similarity computations on these smaller subsets of the network.

In some embodiments, feature vectors representing nodes of the network can also be optimized based on subnet data. For example, instead of encoding an entire IP address as a feature of the feature vector of a node, the IP address may be encoded using the subnet mask of the node (or relevant bits of the subnet mask) or other truncated representation (e.g., an item of an enumerated list). This can reduce processing of the similarity computations by reducing the size of at least one feature of a node. This can also improve the accuracy of similarity computations based on determining a 1-to-1 correspondence of a common feature value rather than assessing a similarity metric based on a number of the most significant bits of respective IP addresses of nodes.

Figure 3:
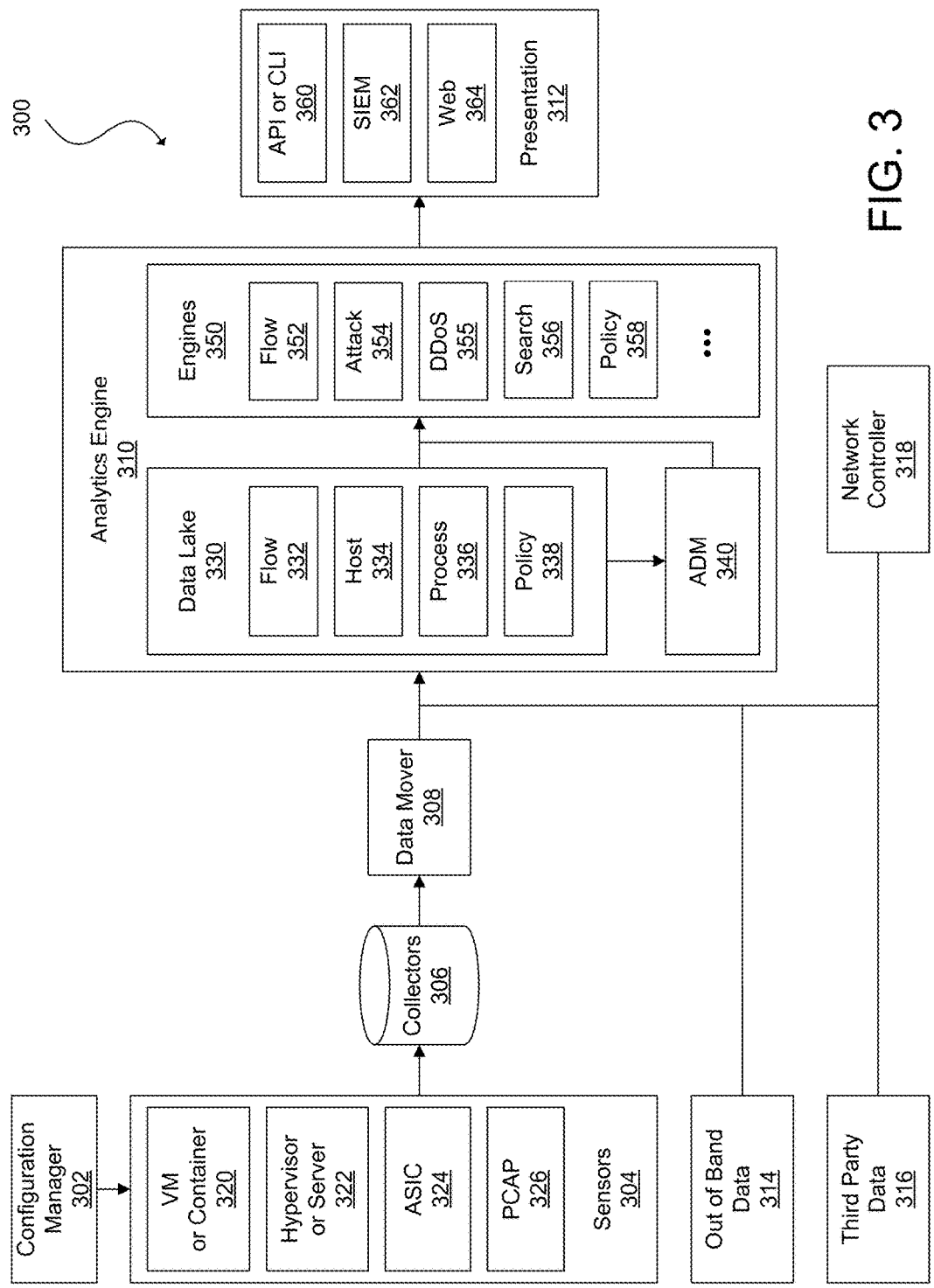
FIG. 3 illustrate an example of a network traffic monitoring system in accordance with an embodiment.

FIG. 3 illustrates a network traffic monitoring system 300 in accordance with an embodiment. The network traffic monitoring system 300 can include a configuration manager 302, sensors 304, a collector module 306, a data mover module 308, an analytics engine 310, and a presentation module 312. In FIG. 3, the analytics engine 310 is also shown in communication with out-of-band data sources 314, third party data sources 316, and a network controller 318.

The configuration manager 302 can be used to provision and maintain the sensors 304, including installing sensor software or firmware in various nodes of a network, configuring the sensors 304, updating the sensor software or firmware, among other sensor management tasks. For example, the sensors 304 can be implemented as virtual partition images (e.g., virtual machine (VM) images or container images), and the configuration manager 302 can distribute the images to host machines. In general, a virtual partition may be an instance of a VM, container, sandbox, or other isolated software environment. The software environment may include an operating system and application software. For software running within a virtual partition, the virtual partition may appear to be, for example, one of many servers or one of many operating systems executed on a single physical server. The configuration manager 302 can instantiate a new virtual partition or migrate an existing partition to a different physical server. The configuration manager 302 can also be used to configure the new or migrated sensor.

The configuration manager 302 can monitor the health of the sensors 304. For example, the configuration manager 302 may request for status updates and/or receive heartbeat messages, initiate performance tests, generate health checks, and perform other health monitoring tasks. In some embodiments, the configuration manager 302 can also authenticate the sensors 304. For instance, the sensors 304 can be assigned a unique identifier, such as by using a one-way hash function of a sensor's basic input/out system (BIOS) universally unique identifier (UUID) and a secret key stored by the configuration image manager 302. The UUID can be a large number that may be difficult for a malicious sensor or other device or component to guess. In some embodiments, the configuration manager 302 can keep the sensors 304 up to date by installing the latest versions of sensor software and/or applying patches. The configuration manager 302 can obtain these updates automatically from a local source or the Internet.

The sensors 304 can reside on various nodes of a network, such as a virtual partition (e.g., VM or container) 320; a hypervisor or shared kernel managing one or more virtual partitions and/or physical servers 322, an application-specific integrated circuit (ASIC) 324 of a switch, router, gateway, or other networking device, or a packet capture (pcap) 326 appliance (e.g., a standalone packet monitor, a device connected to a network devices monitoring port, a device connected in series along a main trunk of a datacenter, or similar device), or other element of a network. The sensors 304 can monitor network traffic between nodes, and send network traffic data and corresponding data (e.g., host data, process data, user data, etc.) to the collectors 308 for storage. For example, the sensors 304 can sniff packets being sent over its hosts' physical or virtual network interface card (NIC), or individual processes can be configured to report network traffic and corresponding data to the sensors 304. Incorporating the sensors 304 on multiple nodes and within multiple partitions of some nodes of the network can provide for robust capture of network traffic and corresponding data from each hop of data transmission. In some embodiments, each node of the network (e.g., VM, container, or other virtual partition 320, hypervisor, shared kernel, or physical server 322, ASIC 324, pcap 326, etc.) includes a respective sensor 304. However, it should be understood that various software and hardware configurations can be used to implement the sensor network 304.

As the sensors 304 capture communications and corresponding data, they may continuously send network traffic data to the collectors 308. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 304 can also determine additional data for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some embodiments, the sensors 304 can perform some preprocessing of the network traffic and corresponding data before sending the data to the collectors 308. For example, the sensors 304 can remove extraneous or duplicative data or they can create summaries of the data (e.g., latency, number of packets per flow, number of bytes per flow, number of flows, etc.). In some embodiments, the sensors 304 can be configured to only capture certain types of network information and disregard the rest. In some embodiments, the sensors 304 can be configured to capture only a representative sample of packets (e.g., every 1,000th packet or other suitable sample rate) and corresponding data.

Since the sensors 304 may be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows the data to be correlated from the various data sources, which may be used as additional data points by the analytics engine 310. Further, collecting network traffic and corresponding data from multiple points of view ensures more accurate data is captured. For example, a conventional sensor network may be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors may not be accurately monitored by the conventional sensor network. The sensor network 304 of various embodiments substantially mitigates or eliminates these issues altogether by locating sensors at multiple points of potential failure. Moreover, the network traffic monitoring system 300 can verify multiple instances of data for a flow (e.g., source endpoint flow data, network device flow data, and endpoint flow data) against one another.

In some embodiments, the network traffic monitoring system 300 can assess a degree of accuracy of flow data sets from multiple sensors and utilize a flow data set from a single sensor determined to be the most accurate and/or complete. The degree of accuracy can be based on factors such as network topology (e.g., a sensor closer to the source may be more likely to be more accurate than a sensor closer to the destination), a state of a sensor or a node hosting the sensor (e.g., a compromised sensor/node may have less accurate flow data than an uncompromised sensor/node), or flow data volume (e.g., a sensor capturing a greater number of packets for a flow may be more accurate than a sensor capturing a smaller number of packets).

In some embodiments, the network traffic monitoring system 300 can assemble the most accurate flow data set and corresponding data from multiple sensors. For instance, a first sensor along a data path may capture data for a first packet of a flow but may be missing data for a second packet of the flow while the situation is reversed for a second sensor along the data path. The network traffic monitoring system 300 can assemble data for the flow from the first packet captured by the first sensor and the second packet captured by the second sensor.

As discussed, the sensors 304 can send network traffic and corresponding data to the collectors 306. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 304 are not assigned specific collectors but the network traffic monitoring system 300 can determine an optimal collector for receiving the network traffic and corresponding data through a discovery process. In such embodiments, a sensor can change where it sends it network traffic and corresponding data if its environments changes, such as if a default collector fails or if the sensor is migrated to a new location and it would be optimal for the sensor to send its data to a different collector. For example, it may be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send first network traffic and corresponding data related to one type of process to one collector and second network traffic and corresponding data related to another type of process to another collector.

The collectors 306 can be any type of storage medium that can serve as a repository for the network traffic and corresponding data captured by the sensors 304. In some embodiments, data storage for the collectors 306 is located in an in-memory database, such as dashDB from IBM®, although it should be appreciated that the data storage for the collectors 306 can be any software and/or hardware capable of providing rapid random access speeds typically used for analytics software. In various embodiments, the collectors 306 can utilize solid state drives, disk drives, magnetic tape drives, or a combination of the foregoing according to cost, responsiveness, and size requirements. Further, the collectors 306 can utilize various database structures such as a normalized relational database or a NoSQL database, among others.

In some embodiments, the collectors 306 may only serve as network storage for the network traffic monitoring system 300. In such embodiments, the network traffic monitoring system 300 can include a data mover module 308 for retrieving data from the collectors 306 and making the data available to network clients, such as the components of the analytics engine 310. In effect, the data mover module 308 can serve as a gateway for presenting network-attached storage to the network clients. In other embodiments, the collectors 306 can perform additional functions, such as organizing, summarizing, and preprocessing data. For example, the collectors 306 can tabulate how often packets of certain sizes or types are transmitted from different nodes of the network. The collectors 306 can also characterize the traffic flows going to and from various nodes. In some embodiments, the collectors 306 can match packets based on sequence numbers, thus identifying traffic flows and connection links. As it may be inefficient to retain all data indefinitely in certain circumstances, in some embodiments, the collectors 306 can periodically replace detailed network traffic data with consolidated summaries. In this manner, the collectors 306 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set may be retained for a lengthier period of time for another set of flows identified as anomalous or as an attack.

Computer networks may be exposed to a variety of different attacks that expose vulnerabilities of computer systems in order to compromise their security. Some network traffic may be associated with malicious programs or devices. The analytics engine 310 may be provided with examples of network states corresponding to an attack and network states corresponding to normal operation. The analytics engine 310 can then analyze network traffic and corresponding data to recognize when the network is under attack. In some embodiments, the network may operate within a trusted environment for a period of time so that the analytics engine 310 can establish a baseline of normal operation. Since malware is constantly evolving and changing, machine learning may be used to dynamically update models for identifying malicious traffic patterns.

In some embodiments, the analytics engine 310 may be used to identify observations which differ from other examples in a dataset. For example, if a training set of example data with known outlier labels exists, supervised anomaly detection techniques may be used. Supervised anomaly detection techniques utilize data sets that have been labeled as normal and abnormal and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set.

The analytics engine 310 can include a data lake 330, an application dependency mapping (ADM) module 340, and elastic processing engines 350. The data lake 330 is a large-scale storage repository that provides massive storage for various types of data, enormous processing power, and the ability to handle nearly limitless concurrent tasks or jobs. In some embodiments, the data lake 330 is implemented using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 308 receives raw network traffic and corresponding data from the collectors 306 and distributes or pushes the data to the data lake 330. The data lake 330 can also receive and store out-of-band data 314, such as statuses on power levels, network availability, server performance, temperature conditions, cage door positions, and other data from internal sources, and third party data 316, such as security reports (e.g., provided by Cisco®, Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, IP watch lists, Whois data, configuration management database (CMDB) or configuration management system (CMS) as a service, and other data from external sources. In other embodiments, the data lake 330 may instead fetch or pull raw traffic and corresponding data from the collectors 306 and relevant data from the out-of-band data sources 314 and the third party data sources 316. In yet other embodiments, the functionality of the collectors 306, the data mover 308, the out-of-band data sources 314, the third party data sources 316, and the data lake 330 can be combined. Various combinations and configurations are possible as would be known to one of ordinary skill in the art.

Each component of the data lake 330 can perform certain processing of the raw network traffic data and/or other data (e.g., host data, process data, user data, out-of-band data or third party data) to transform the raw data to a form useable by the elastic processing engines 350. In some embodiments, the data lake 330 can include repositories for flow attributes 332, host and/or endpoint attributes 334, process attributes 336, and policy attributes 338. In some embodiments, the data lake 330 can also include repositories for VM or container attributes, application attributes, tenant attributes, network topology, application dependency maps, cluster attributes, etc.

The flow attributes 332 relate to information about flows traversing the network. A flow is generally one or more packets sharing certain attributes that are sent within a network within a specified period of time. The flow attributes 332 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address may correspond to a first endpoint (e.g., network device, physical server, virtual partition, etc.) of the network, and the destination address may correspond to a second endpoint, a multicast group, or a broadcast domain. The flow attributes 332 can also include aggregate packet data such as flow start time, flow end time, number of packets for a flow, number of bytes for a flow, the union of TCP flags for a flow, among other flow data.

The host and/or endpoint attributes 334 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 334 can also include the out-of-band data 314 regarding hosts such as power level, temperature, and physical location (e.g., room, row, rack, cage door position, etc.) or the third party data 316 such as whether a host and/or endpoint is on an IP watch list or otherwise associated with a security threat, Whois data, or geocoordinates. In some embodiments, the out-of-band data 314 and the third party data 316 may be associated by process, user, flow, or other more granular or less granular network element or network communication.

The process attributes 336 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 338 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. The policy attributes 338 can include policy statistics such as a number of times a policy was enforced or a number of times a policy was not enforced. The policy attributes 338 can also include associations with network traffic data. For example, flows found to be non-conformant can be linked or tagged with corresponding policies to assist in the investigation of non-conformance.

The analytics engine 310 may include any number of engines 350, including for example, a flow engine 352 for identifying flows (e.g., flow engine 352) or an attacks engine 354 for identify attacks to the network. In some embodiments, the analytics engine can include a separate distributed denial of service (DDoS) attack engine 355 for specifically detecting DDoS attacks. In other embodiments, a DDoS attack engine may be a component or a sub-engine of a general attacks engine. In some embodiments, the attacks engine 354 and/or the DDoS engine 355 can use machine learning techniques to identify security threats to a network. For example, the attacks engine 354 and/or the DDoS engine 355 can be provided with examples of network states corresponding to an attack and network states corresponding to normal operation. The attacks engine 354 and/or the DDoS engine 355 can then analyze network traffic data to recognize when the network is under attack. In some embodiments, the network can operate within a trusted environment for a time to establish a baseline for normal network operation for the attacks engine 354 and/or the DDoS.

The analytics engine 310 may further include a search engine 356. The search engine 356 may be configured, for example to perform a structured search, an NLP (Natural Language Processing) search, or a visual search. Data may be provided to the engines from one or more processing components.

The analytics engine 310 can also include a policy engine 358 that manages network policy, including creating and/or importing policies, monitoring policy conformance and non-conformance, enforcing policy, simulating changes to policy or network elements affecting policy, among other policy-related tasks.

The ADM module 340 can determine dependencies of applications of the network. That is, particular patterns of traffic may correspond to an application, and the interconnectivity or dependencies of the application can be mapped to generate a graph for the application (i.e., an application dependency mapping). In this context, an application refers to a set of networking components that provides connectivity for a given set of workloads. For example, in a conventional three-tier architecture for a web application, first endpoints of the web tier, second endpoints of the application tier, and third endpoints of the data tier make up the web application. The ADM module 340 can receive input data from various repositories of the data lake 330 (e.g., the flow attributes 332, the host and/or endpoint attributes 334, the process attributes 336, etc.). The ADM module 340 may analyze the input data to determine that there is first traffic flowing between external endpoints on port 80 of the first endpoints corresponding to Hypertext Transfer Protocol (HTTP) requests and responses. The input data may also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 340 may define an ADM for the web application as a three-tier application including a first EPG comprising the first endpoints, a second EPG comprising the second endpoints, and a third EPG comprising the third endpoints.

The presentation module 312 can include an application programming interface (API) or command line interface (CLI) 360, a security information and event management (SIEM) interface 362, and a web front-end 364. As the analytics engine 310 processes network traffic and corresponding data and generates analytics data, the analytics data may not be in a human-readable form or it may be too voluminous for a user to navigate. The presentation module 312 can take the analytics data generated by analytics engine 310 and further summarize, filter, and organize the analytics data as well as create intuitive presentations for the analytics data.

In some embodiments, the API or CLI 360 can be implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an application programming interface (API) for the programming language Java®, which defines how a client may access a database.

In some embodiments, the SIEM interface 362 can be implemented using Hadoop® Kafka for the back end, and software provided by Splunk®, Inc. of San Francisco, Calif. as the SIEM platform. Kafka is a distributed messaging system that is partitioned and replicated. Kafka uses the concept of topics. Topics are feeds of messages in specific categories. In some embodiments, Kafka can take raw packet captures and telemetry information from the data mover 308 as input, and output messages to a STEM platform, such as Splunk®. The Splunk® platform is utilized for searching, monitoring, and analyzing machine-generated data.

In some embodiments, the web front-end 364 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 3 illustrates an example configuration of the various components of a network traffic monitoring system, those of skill in the art will understand that the components of the network traffic monitoring system 300 or any system described herein can be configured in a number of different ways and can include any other type and number of components. For example, the sensors 304, the collectors 306, the data mover 308, and the data lake 330 can belong to one hardware and/or software module or multiple separate modules. Other modules can also be combined into fewer components and/or further divided into more components.

Figure 4:
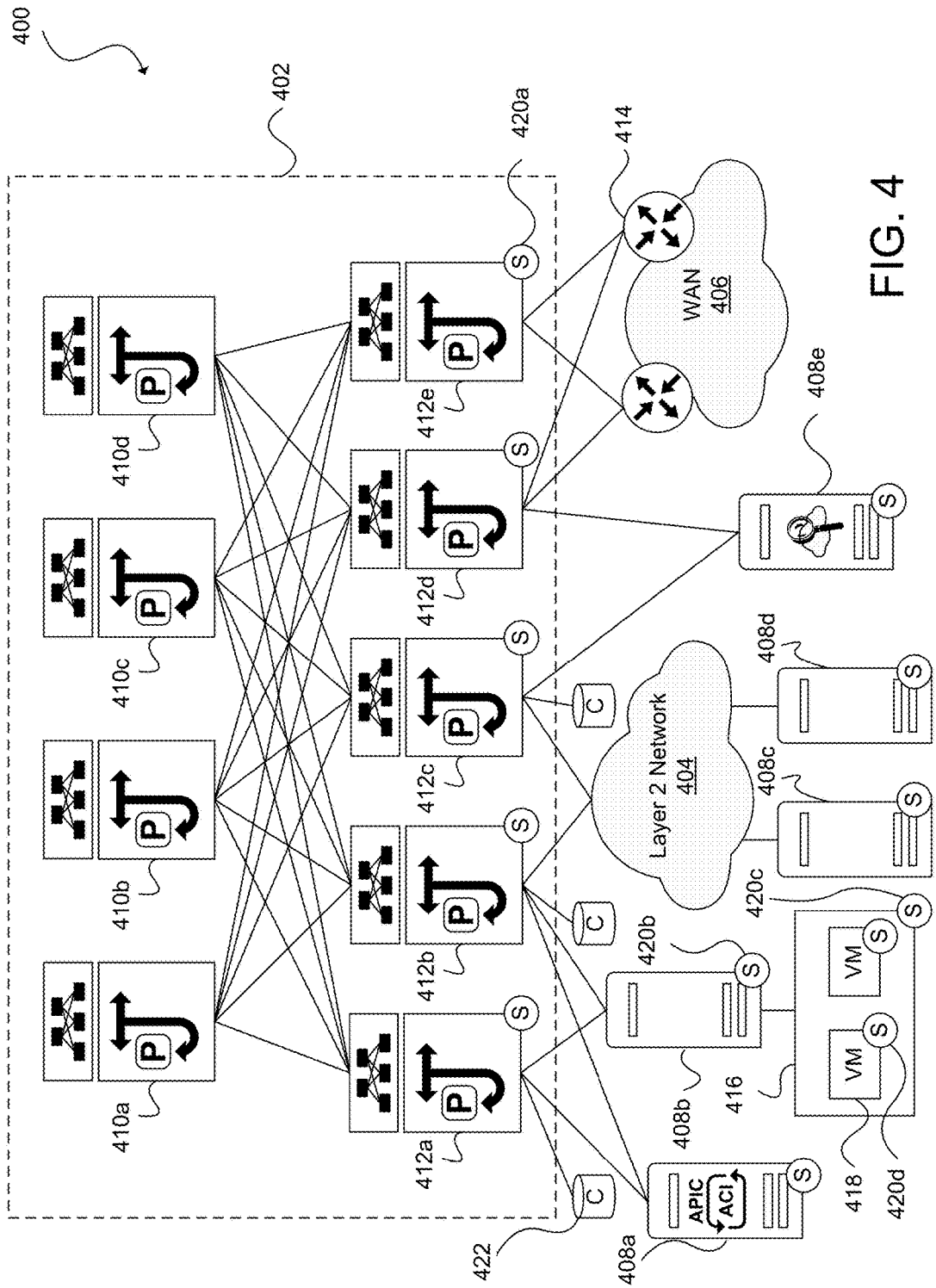
FIG. 4 illustrates an example of a network environment in accordance with an embodiment.

FIG. 4 illustrates an example of a network environment 400 in accordance with an embodiment. In some embodiments, a network traffic monitoring system, such as the network traffic monitoring system 300 of FIG. 3, can be implemented in the network environment 400. It should be understood that, for the network environment 400 and any environment discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network environment 400 can include any number or type of resources, which can be accessed and utilized by clients or tenants. The illustrations and examples provided herein are for clarity and simplicity.

The network environment 400 can include a network fabric 402, a Layer 2 (L2) network 404, a Layer 3 (L3) network 406, and servers 408a, 408b, 408c, 408d, and 408e (collectively, 408). The network fabric 402 can include spine switches 410a, 410b, 410c, and 410d (collectively, "410") and leaf switches 412a, 412b, 412c, 412d, and 412e (collectively, "412"). The spine switches 410 can connect to the leaf switches 412 in the network fabric 402. The leaf switches 412 can include access ports (or non-fabric ports) and fabric ports. The fabric ports can provide uplinks to the spine switches 410, while the access ports can provide connectivity to endpoints (e.g., the servers 408), internal networks (e.g., the L2 network 404), or external networks (e.g., the L3 network 406).

The leaf switches 412 can reside at the edge of the network fabric 402, and can thus represent the physical network edge. For instance, in some embodiments, the leaf switches 412d and 412e operate as border leaf switches in communication with edge devices 414 located in the external network 406. The border leaf switches 412d and 412e may be used to connect any type of external network device, service (e.g., firewall, deep packet inspector, traffic monitor, load balancer, etc.), or network (e.g., the L3 network 406) to the fabric 402.

Although the network fabric 402 is illustrated and described herein as an example leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 412 can be top-of-rack switches configured according to a top-of-rack architecture. In other embodiments, the leaf switches 412 can be aggregation switches in any particular topology, such as end-of-row or middle-of-row topologies. In some embodiments, the leaf switches 412 can also be implemented using aggregation switches.

Moreover, the topology illustrated in FIG. 4 and described herein is readily scalable and may accommodate a large number of components, as well as more complicated arrangements and configurations. For example, the network may include any number of fabrics 402, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communications in the network fabric 402 can flow through the leaf switches 412. In some embodiments, the leaf switches 412 can provide endpoints (e.g., the servers 408), internal networks (e.g., the L2 network 404), or external networks (e.g., the L3 network 406) access to the network fabric 402, and can connect the leaf switches 412 to each other. In some embodiments, the leaf switches 412 can connect endpoint groups (EPGs) to the network fabric 402, internal networks (e.g., the L2 network 404), and/or any external networks (e.g., the L3 network 406). EPGs are groupings of applications, or application components, and tiers for implementing forwarding and policy logic. EPGs can allow for separation of network policy, security, and forwarding from addressing by using logical application boundaries. EPGs can be used in the network environment 400 for mapping applications in the network. For example, EPGs can comprise a grouping of endpoints in the network indicating connectivity and policy for applications.

As discussed, the servers 408 can connect to the network fabric 402 via the leaf switches 412. For example, the servers 408a and 408b can connect directly to the leaf switches 412a and 412b, which can connect the servers 408a and 408b to the network fabric 402 and/or any of the other leaf switches. The servers 408c and 408d can connect to the leaf switches 412b and 412c via the L2 network 404. The servers 408c and 408d and the L2 network 404 make up a local area network (LAN). LANs can connect nodes over dedicated private communications links located in the same general physical location, such as a building or campus.

The WAN 406 can connect to the leaf switches 412d or 412e via the L3 network 406. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints 408 can include any communication device or component, such as a computer, server, blade, hypervisor, virtual machine, container, process (e.g., running on a virtual machine), switch, router, gateway, host, device, external network, etc.

In some embodiments, the network environment 400 also includes a network controller running on the host 408a. The network controller is implemented using the Application Policy Infrastructure Controller (APIC™) from Cisco®. The APIC™ provides a centralized point of automation and management, policy programming, application deployment, and health monitoring for the fabric 402. In some embodiments, the APIC™ is operated as a replicated synchronized clustered controller. In other embodiments, other configurations or software-defined networking (SDN) platforms can be utilized for managing the fabric 402.

In some embodiments, a physical server 408 may have instantiated thereon a hypervisor 416 for creating and running one or more virtual switches (not shown) and one or more virtual machines 418, as shown for the host 408b. In other embodiments, physical servers may run a shared kernel for hosting containers. In yet other embodiments, the physical server 408 can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions, such as the servers 408a, 408c, 408d, and 408e.

The network environment 400 can also integrate a network traffic monitoring system, such as the network traffic monitoring system 300 shown in FIG. 3. For example, the network traffic monitoring system of FIG. 4 includes sensors 420a, 420b, 420c, and 420d (collectively, "420"), collectors 422, and an analytics engine, such as the analytics engine 310 of FIG. 3, executing on the server 408e. The analytics engine 408e can receive and process network traffic data collected by the collectors 422 and detected by the sensors 420 placed on nodes located throughout the network environment 400. Although the analytics engine 408e is shown to be a standalone network appliance in FIG. 4, it will be appreciated that the analytics engine 408e can also be implemented as a virtual partition (e.g., VM or container) that can be distributed onto a host or cluster of hosts, software as a service (SaaS), or other suitable method of distribution. In some embodiments, the sensors 420 run on the leaf switches 412 (e.g., the sensor 420a), the hosts 408 (e.g., the sensor 420b), the hypervisor 416 (e.g., the sensor 420c), and the VMs 418 (e.g., the sensor 420d). In other embodiments, the sensors 420 can also run on the spine switches 410, virtual switches, service appliances (e.g., firewall, deep packet inspector, traffic monitor, load balancer, etc.) and in between network elements. In some embodiments, sensors 420 can be located at each (or nearly every) network component to capture granular packet statistics and data at each hop of data transmission. In other embodiments, the sensors 420 may not be installed in all components or portions of the network (e.g., shared hosting environment in which customers have exclusive control of some virtual machines).

As shown in FIG. 4, a host may include multiple sensors 420 running on the host (e.g., the host sensor 420b) and various components of the host (e.g., the hypervisor sensor 420c and the VM sensor 420d) so that all (or substantially all) packets traversing the network environment 400 may be monitored. For example, if one of the VMs 418 running on the host 408b receives a first packet from the WAN 406, the first packet may pass through the border leaf switch 412d, the spine switch 410b, the leaf switch 412b, the host 408b, the hypervisor 416, and the VM. Since all or nearly all of these components contain a respective sensor, the first packet will likely be identified and reported to one of the collectors 422. As another example, if a second packet is transmitted from one of the VMs 418 running on the host 408b to the host 408d, sensors installed along the data path, such as at the VM 418, the hypervisor 416, the host 408b, the leaf switch 412b, and the host 408d will likely result in capture of metadata from the second packet.

Figure 5:
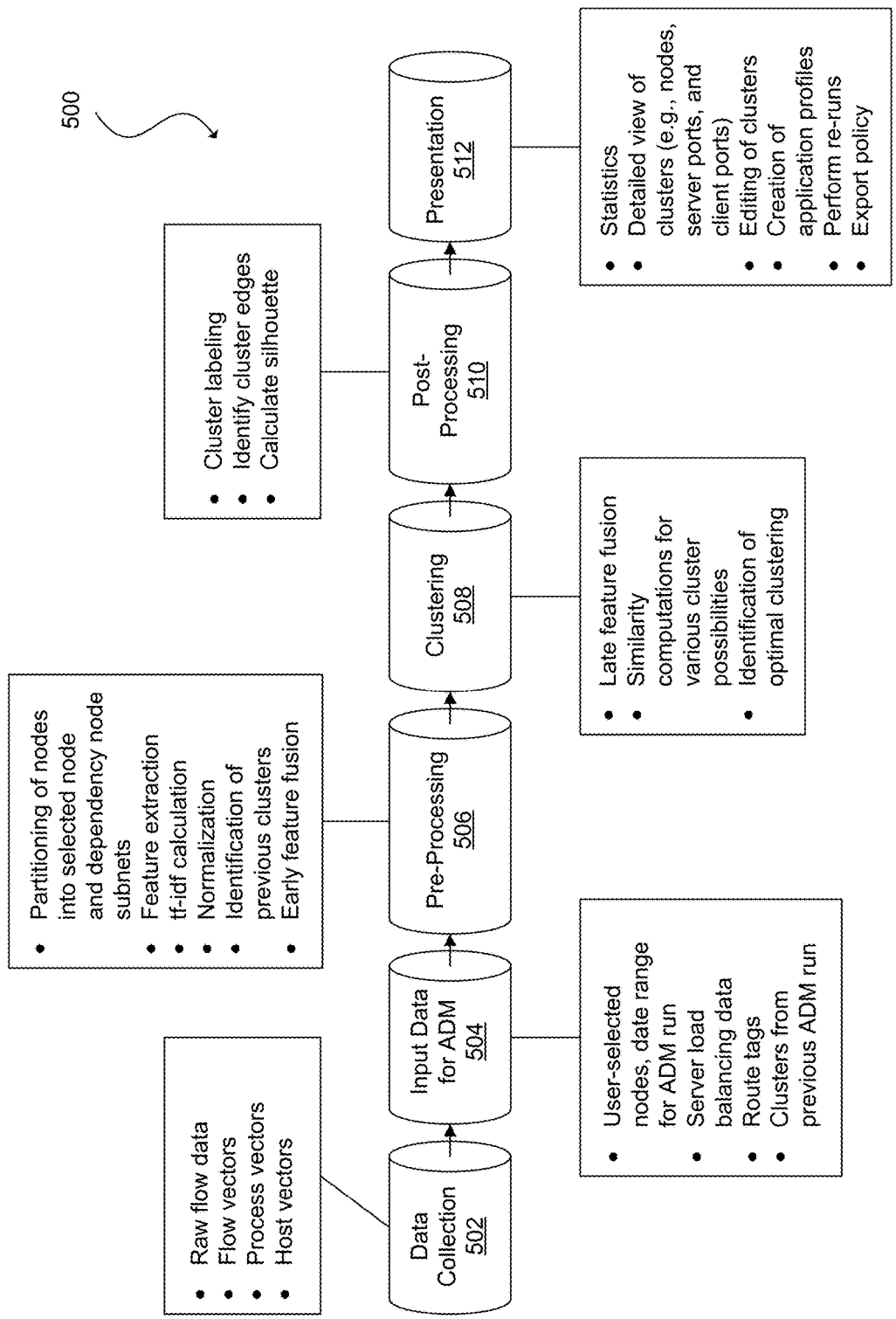
FIG. 5 illustrates an example of a data pipeline for determining clusters in an application dependency map in accordance with an embodiment.

FIG. 5 illustrates an example of a data pipeline 500 for determining clusters in an application dependency map in accordance with an example embodiment. In some embodiments, the data pipeline 500 can be directed by a network traffic monitoring system, such as the network traffic monitoring system 300 of FIG. 3; an analytics engine, such as the analytics engine 310 of FIG. 3; an application dependency mapping module, such as the ADM module 340 of FIG. 3; or other network service or network appliance. The data pipeline 500 includes a data collection stage 502 in which network traffic data and corresponding data (e.g., host data, process data, user data, etc.) are captured by sensors (e.g., the sensors 304 of FIG. 3) located throughout the network. The data may comprise, for example, raw flow data and raw process data. As discussed, the data can be captured from multiple perspectives to provide a comprehensive view of the network. The data collected may also include other types of information, such as tenant information, virtual partition information, out-of-band information, third party information, and other relevant information. In some embodiments, the flow data and associated data can be aggregated and summarized daily or according to another suitable increment of time, and flow vectors, process vectors, host vectors, and other feature vectors can be calculated during the data collection stage 502. This can substantially reduce processing during an ADM run.

The data pipeline 500 also includes an ADM input data stage 504 in which a network or security administrator or other authorized user may configure an ADM run by selecting the date range of the flow data and associated data to analyze, and those nodes for which the administrator wants application dependency maps and/or cluster information. In some embodiments, the administrator can also input side information, such as server load balance, route tags, and previously identified clusters during the ADM input data stage 504. In other embodiments, the side information can be automatically pulled or another network element can push the side information for the ADM run.

The next stage of the data pipeline 500 is pre-processing 506. During the pre-processing stage 506, nodes of the network are partitioned into selected node and dependency node subnets. Selected nodes are those nodes for which the user requests application dependency maps and cluster information. Dependency nodes are those nodes that are not explicitly selected by the users for an ADM run but are nodes that communicate with the selected nodes. To obtain the partitioning information, edges of an application dependency map (i.e., flow data) and unprocessed feature vectors can be analyzed.

Other tasks can also be performed during the pre-processing stage 506, including identifying dependencies of the selected nodes and the dependency nodes; replacing the dependency nodes with tags based on the dependency nodes' subnet names; extracting feature vectors for the selected nodes, such as by aggregating daily vectors across multiple days, calculating term frequency-inverse document frequency (tf-idf), and normalizing the vectors (e.g., $l_2$ normalization); and identifying existing clusters.

In some embodiments, the pre-processing stage 506 can include early feature fusion pre-processing. Early fusion is a fusion scheme in which features are combined into a single representation. Features may be derived from various domains (e.g., network, host, virtual partition, process, user, etc.), and a feature vector in an early fusion system may represent the concatenation of disparate feature types or domains.

Early fusion may be effective for features that are similar or have a similar structure (e.g., fields of TCP and UDP packets or flows). Such features may be characterized as being a same type or being within a same domain. Early fusion may be less effective for distant features or features of different types or domains (e.g., flow-based features versus process-based features). Thus, in some embodiments, only features in the network domain (i.e., network traffic-based features, such as packet header information, number of packets for a flow, number of bytes for a flow, and similar data) may be analyzed. In other embodiments, an ADM run may limit analysis to features in the process domain (i.e., process-based features, such as process name, parent process, process owner, etc.). In yet other embodiments, feature sets in other domains (e.g., the host domain, virtual partition domain, user domain, etc.) may be the focus of the ADM run.

After pre-processing, the data pipeline 500 may proceed to a clustering stage 508. In the clustering stage 508, various machine learning techniques can be implemented to analyze feature vectors within a single domain or across different domains to determine the optimal clustering given a set of input nodes. Machine learning is an area of computer science in which the goal is to develop models using example observations (i.e., training data), that can be used to make predictions on new observations. The models or logic are not based on theory but are empirically based or data-driven.

Machine learning can be categorized as supervised or unsupervised. In supervised learning, the training data examples contain labels for the outcome variable of interest. There are example inputs and the values of the outcome variable of interest are known in the training data. The goal of supervised learning is to learn a method for mapping inputs to the outcome of interest. The supervised models then make predictions about the values of the outcome variable for new observations. Supervised learning methods include boosting, neural networks, and random forests, among others.

Boosting is a machine learning algorithm which finds a highly accurate hypothesis (e.g., low error rate) from a combination of many "weak" hypotheses (e.g., substantial error rate). Given a data set comprising examples within a class and not within the class and weights based on the difficulty of classifying an example and a weak set of classifiers, boosting generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified).

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include the multilayer neural network, the auto associative neural network, the probabilistic decision-based neural network (PDBNN), and the sparse network of winnows (SNOW).

A random forest is a machine learning algorithm that relies on a combination of decision trees in which each tree depends on the values of a random vector sampled independently and with the same distribution for all trees in the forest. A random forest can be trained for some number of trees 'T' by sampling 'N' cases of the training data at random with replacement to create a subset of the training data. At each node, a number 'm' of the features are selected at random from the set of all features. The feature that provides the best split is used to do a binary split on that node. At the next node, another number 'm' of the features are selected at random and the process is repeated.

In unsupervised learning, there are example inputs, however, no outcome values. The goal of unsupervised learning can be to find patterns in the data or predict a desired outcome. Unsupervised learning methods include principle component analysis (PCA), expectation-maximization (EM), and clustering, among others.

PCA is a machine learning algorithm that uses an orthogonal transformation to convert a set of observations of possibly correlated variables into a set of values of linearly uncorrelated variables called principal components. The number of principal components is less than or equal to the number of original variables. This transformation is defined in such a way that the first principal component has the largest possible variance (i.e., the principal component accounts for as much of the variability in the data as possible), and each succeeding component in turn has the highest variance possible under the constraint that it is orthogonal to the preceding components. The resulting vectors are an uncorrelated orthogonal basis set.

Clustering is a process that groups a set of objects into the same group (i.e., cluster) when the objects are more similar, less distant, denser, or otherwise share more attributes with respect to each other than to those in other groups. An example of clustering is the k-means algorithm in which a number of n nodes are partitioned into k clusters such that each node belongs to the cluster with the nearest mean. The algorithm proceeds by alternating steps, assignment and update. During assignment, each node is assigned to a cluster whose mean yields the least within-cluster sum of squares (WCSS) (i.e., the nearest mean). During update, the new means is calculated to be the centroids of the nodes in the new clusters. Convergence is achieved when the assignments no longer change. The k-means algorithm is an example of partition clustering. Other approaches for clustering include hierarchical clustering (e.g., agglomerative and divisive methods), density-based clustering (e.g., EM or DBSCAN), model-based clustering (e.g., decision trees or neural networks), grid-based clustering (e.g., fuzzy or evolutionary methods), among other categories.

EM is an iterative process for finding the maximum likelihood or maximum a posteriori estimates of parameters in a statistical model, where the model depends on unobserved latent variables. The EM iteration alternates between performing an expectation (E) step, which creates a function for the expectation of the log-likelihood evaluated using the current estimate for the parameters, and a maximization (M) step, which computes parameters maximizing the expected log-likelihood found during the E step. These parameter-estimates are then used to determine the distribution of the latent variables in the next E step.

During the clustering stage 508, respective feature vectors of nodes are evaluated using machine learning to identify an optimal clustering for a selected set of nodes. Supervised or unsupervised learning techniques can be used depending on the availability of training data and other related information (e.g., network topology). For example, an ADM module (or other suitable system) can receive configuration information regarding a network from a configuration management system (CMS), configuration management database (CMDB), or other similar system. In some embodiments, the ADM module can receive the configuration data in a proprietary or open source format utilized by the CMS or CMDB and translate the information to training data observations for the particular machine learning approach(es) implemented by the ADM module. In other embodiments, the CMS or CMDB and the ADM module may be closely integrated and the CMS or CMDB can automatically provide the ADM module with suitable training data. In yet other embodiments, a network administrator or authorized user may receive the configuration data from the CM and the administrator or user can manually label nodes to create the training data.

Figure 6A:
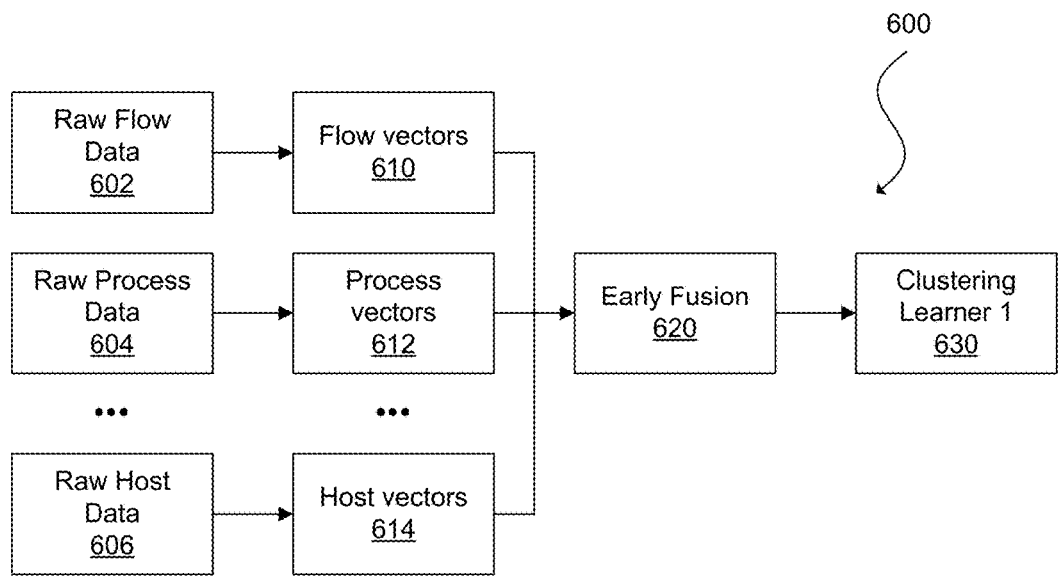
FIG. 6A and FIG. 6B illustrate example fusion systems in accordance with some embodiments.

In some embodiments, the clustering stage 508 can utilize early fusion for determining clusters for a selected set of nodes. FIG. 6A illustrates an example of a system for clustering using early feature fusion 600 in accordance with an embodiment. In the early fusion system 600, raw data is collected across different domains, including raw flow data 602, raw process data 604, and raw host data 606. The raw data can be collected by a sensor network, such as the sensor network 304 of FIG. 3 or the sensor network 220 of FIG. 2. The raw flow data 602, the raw process data 604, and the raw host data can be pre-processed, such as described with respect to the pre-processing stage 506 of FIG. 5, to extract flow feature vectors 610, process feature vectors 612, and host feature vectors 614, respectively.

The feature vectors can be received by an early fusion module 620 for combining the feature vectors into a monolithic feature vector. For example, feature vectors for the fusion system 600 may be encoded as bytes (i.e., structured), and the early fusion module 620 can write values of the flow vectors 610 to a first set of bytes of a byte representation of the single vector, values of the process vectors 612 to a second set of bytes of the byte representation, and values of the host vectors 614 to a third set of bytes of the byte representation. In some embodiments, feature vectors for the system 600 may be encoded as variable-length strings (i.e., unstructured), and the early fusion module 620 can concatenate strings corresponding to the flow vectors 610, the process vectors 612, and the host vectors 614, using delimiters to mark the bounds of each feature across the flow, process, and host domains. The early fusion module 620 may also perform other tasks relating to combining features from multiple domains into a single representation, such as encoding/decoding feature vectors, truncating feature vectors and/or feature vector values, handling missing feature values, among other tasks.

The monolithic feature vectors generated by the early fusion module 620 may be received by first clustering module 630, which can implement a suitable clustering algorithm (e.g., k-means, hierarchical clustering, EM, DBScan, decision trees, neural networks, fuzzy clustering, evolutionary clustering, etc.). The suitable clustering algorithm can be user-specified or can be based on a maximum rule (e.g., the ML algorithm with the highest level of confidence, highest level of accuracy, etc.), a minimum rule (e.g., the ML algorithm with the lowest error rate, least memory utilization, least CPU utilization, least network utilization, etc.), a majority rule (e.g., the greatest number of ADM runs meeting a specified threshold level of accuracy), or some combination thereof.

In some embodiments, the particular machine learning algorithm implemented by the first clustering module 630 can also depend on the features selected within each domain, how feature values are represented, how the features are combined, availability of training data, tolerance to missing values, tolerance to irrelevant features, tolerance to redundant features, tolerance to highly interdependent features, network topology, and numerous other factors. The appropriate machine learning system will be apparent to those of ordinary skill in the art when practicing the various embodiments.

Figure 6B:
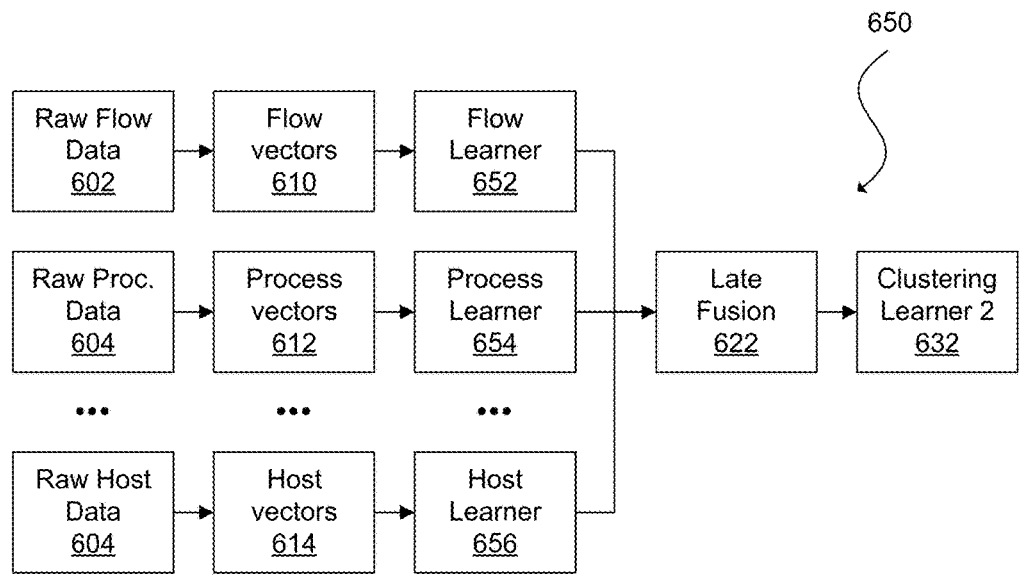

In some embodiments, the clustering stage 508 can include processing for late feature fusion. FIG. 6B illustrates an example of a late fusion system 650 in accordance with an embodiment. In the late fusion system 650, raw flow data 602, raw process data 604, and raw host data 606 can be captured and flow feature vectors 610, process feature vectors 612, and host feature vectors 614 can be extracted similarly as the early fusion system 600 and as discussed throughout the present disclosure. The late fusion system 650 begins to differ from the early fusion system 600 from this point onward. Instead of combining feature vectors into a monolithic feature vector, the late fusion system processes the flow feature vectors 610, the process feature vectors 612, and the host feature vectors 614 using flow-based learner 652, process-based learner 654, and host-based learner 656, respectively. That is, feature vectors for each domain are processed by domain-specific machine learning modules. The flow-based learner 652, the process-based learner 654, and the host-based learner 656 may implement the same or different machine learning algorithms.

Late fusion module 622 receives outputs from the flow-based learner 652, the process-based learner 654, and the host-based learner 656, and may combine the outputs for second clustering module 632, or the second clustering module 632 can evaluate the outputs from the flow-based learner 652, the process-based learner 654, and the host-based learner 656 separately. The second clustering module 632 can implement the same or a different machine learning algorithm from the machine learning algorithm(s) of the flow-based learner 652, the process-based learner 654, and the host-based learner 656. In some embodiments, the late fusion module 622 may normalize the outputs from the flow-based learner 652, the process-based learner 654, and the host-based learner 656 and concatenate them for analysis by the cluster module 632. In other embodiments, the results of an individual domain-specific learner may be a similarity vector which can be combined with the results from other domain-specific learners to form a similarity matrix, such as by averaging, percentiling or binning, weighted averaging, etc. In averaging, each similarity (or distance) score of a first similarity (or distance) vector may be averaged with a corresponding similarity (or distance) score of a second similarity (or distance) vector to yield a single similarity (or distance) vector. Weighted averaging applies different weights to similarity scores or vectors. Weights can be user-specified or automatically obtained from automated cluster evaluations, such as via silhouette scores. Percentiling or binning maps similarity scores or vectors (or distance scores or vectors) to percentiles to account for different similarity (or distance) score distributions. In some embodiments, percentiling may be limited to nodes corresponding to the highest similarity scores (or lowest distance scores). In some embodiments, the late fusion module 622 can use various set operations to combine respective clustering results from each of the flow learner 652, the process learner 654, and the host learner 656. For example, the late fusion module 622 may define clusters as the intersections, unions, or complements of respective clusters determined by the flow learner 652, the process learner 654, and the host learner 656. That is, if a first cluster determined by a first learner includes nodes $\{1, 2, 3, 4\}$ and a second cluster determined by a second learner includes nodes $\{3, 4, 5\}$, then using the intersection operation may result in clusters $\{1\}, \{2\}, \{3, 4\}$, and $\{5\}$. On the other hand, applying the union operation to the first and second clusters may yield a single cluster $\{1, 2, 3, 4, 5\}$. As will be understood by one of ordinary skill, various combinations of set operations can be utilized by the late fusion module 622 for combining respective clusters determined by each of the flow learner 652, the process learner 654, and the host learner 656.

The late fusion module 622 can analyze the similarity matrices of two or more nodes and compare relative similarities among the nodes to arrive at the optimal number of clusters and the optimal clustering. The clustering module 632 may use any suitable machine learning algorithm depending on the various factors discussed herein (e.g., feature selection, feature representation, tolerances, etc.).

After clusters are identified, the data pipeline 500 can include a post-processing stage 510. The post-processing stage 510 can include tasks such as naming or labeling clusters, which may be automatic or user-specified; identifying cluster edges; and validating the clusters, such as by calculating silhouette scores. Silhouette scoring is a method of interpretation and validation of consistency within clusters of data. A silhouette score is a measure of how similar an object is to its own cluster compared to other clusters, which can range from −1 to 1, where a high value indicates that the node is well matched to its own cluster and badly matched to neighboring clusters. If most nodes have a high silhouette score, then the clustering maybe accurate. If many nodes have a low or negative silhouette score, then the clustering may have too many or too few clusters. The silhouette score can be calculated with any similarity or distance metric, such as the Euclidean distance or the Manhattan distance.

The end of the data pipeline 500 is a presentation stage 512 in which clustering data can be meaningfully and intuitively displayed to the user. In some embodiments, a user interface of the presentation stage 512 may allow the user to view statistics on clusters (e.g., number of nodes, edges, clusters, summaries of changes in clustering from the last ADM run, etc.) and detailed information for each cluster (e.g., nodes, server ports, and client ports, etc.). In some embodiments, the user interface may also allow the user to edit clusters (e.g., add or modify names and descriptions of clusters, move nodes from one cluster to another, approve an automatically determined cluster). In some embodiments, the user may operate the user interface to create application profiles, perform ADM re-runs, and/or export policies for cluster edges. It should be understood that the data pipeline 500 is only an example and that stages may be added, combined, removed, or modified without departing from the scope of the various embodiments.

Figure 7:
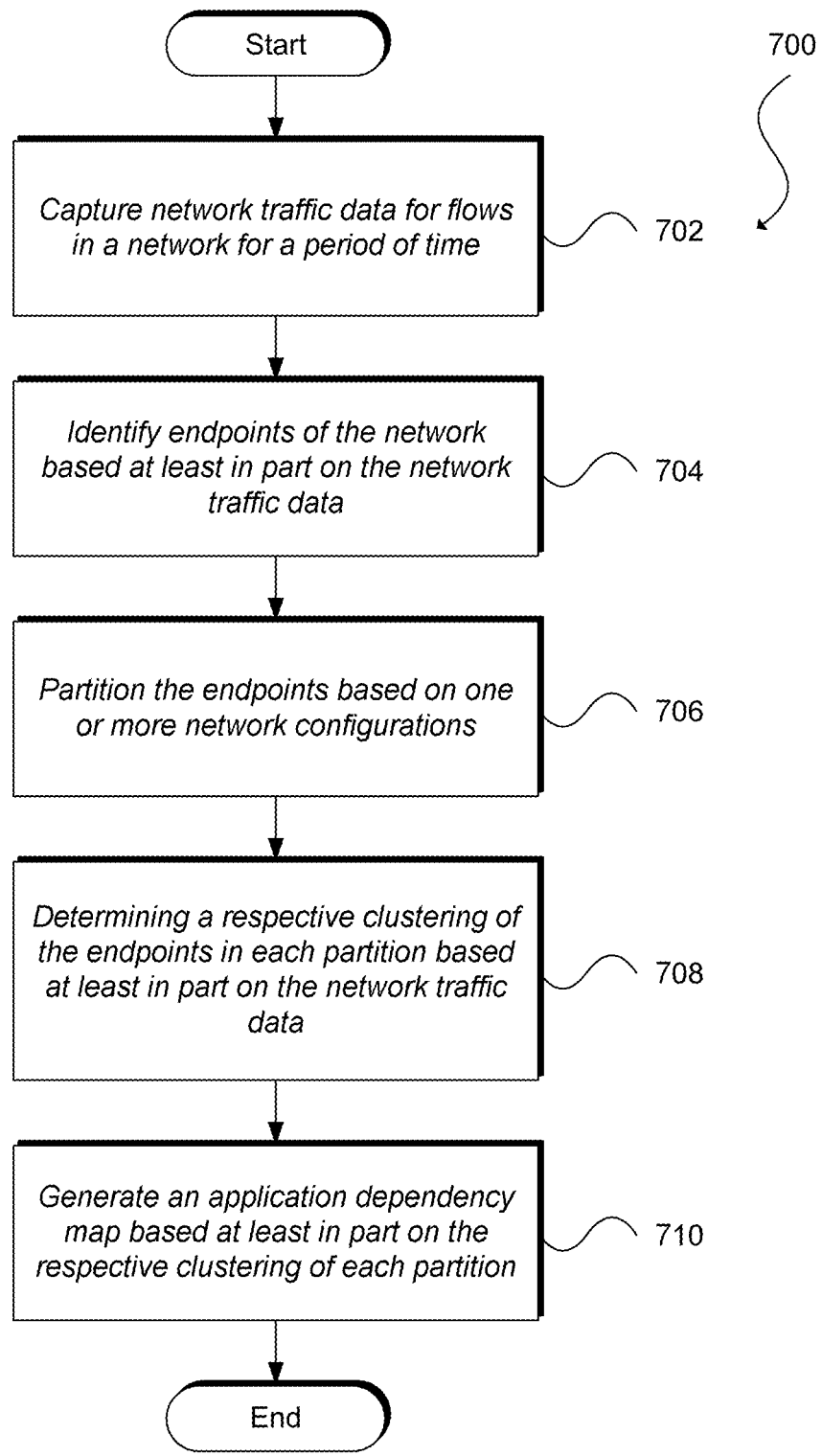
FIG. 7 shows an example of a process for determining clusters in an application dependency map in accordance with an embodiment.

FIG. 7 illustrates an example of a process 700 for determining clusters of an application dependency map in accordance with an embodiment. It should be understood that, for any process discussed herein, there can be additional, fewer, or alternative steps performed in similar or alternative orders, or in parallel, within the scope of the various embodiments unless otherwise stated. The process 700 can be performed by a network, and particularly, a network traffic monitoring system (e.g., the network traffic monitoring system 300 of FIG. 3), an analytics engine (e.g., the analytics engine 310 of FIG. 3), a network controller (e.g., the network controller 318 of FIG. 3), an ADM module (e.g., the ADM module 340 of FIG. 3), a network operating system, a virtualization manager, a network virtualization manager, or similar system.

In the embodiment of FIG. 7, the process 700 can begin at step 702 in which the network captures traffic data for flows passing to, from, and through nodes of the network. In some embodiments, network topology information and application information (e.g., configuration information, previously generated application dependency maps, application policies, etc.) may also be collected. In some embodiments, out-of-band data (e.g., power level, temperature, and physical location) and third party data (e.g., CMDB or CMS as a service, Whois, geocoordinates, etc.) can also be collected. In some embodiments, the network topology, application information, and out of band data can be used to validate the automatically generated application dependency map or to enhance visual presentation of the application dependency map.

As discussed, a sensor network can collect the traffic data from multiple perspectives to provide a comprehensive view of network behavior. The sensor network may include sensors at multiple nodes of a data path of a flow (e.g., network devices, physical servers) and within multiple partitions of a node (e.g., hypervisor, container engine, VM, container, etc.). The captured traffic data can include packet attributes of flows, host attributes of sources or destinations of flows, virtualization attributes of the sources or destinations, process attributes of processes initiating the flows, and user attributes of process owners.

Features or attributes of a source host or destination host that may be captured by the network include the host name, network address, operating system, CPU usage, memory usage, network usage, disk space, ports, logged users, scheduled jobs, open files, and information regarding files and/or directories stored on the host.

Features or attributes from a virtualization platform of the source host or destination that may be captured by the network can include the name of the virtualization platform and version or build number, configuration information, host information (e.g., host operating system (OS), manufacturer, model, processor type, CPU cores, memory capacity, boot time, and other features similar to those of the host domain), a list of running VMs or containers, tenant information (e.g., tenant name, permissions, users associated with the tenant and individual user's information), and individual guest information (e.g., VM or container name, guest OS, guest memory utilization, guest CPU utilization, and other features similar to those of the host domain).

Features or attributes from a process initiating the flow that may be captured by the network may include the process name, ID, parent process ID, process path, CPU utilization, memory utilization, memory address, scheduling information, nice value, flags, priority, status, start time, terminal type, CPU time taken by the process, the command that started the process, and process owner.

Features or attributes from a process owner or user that may be captured by the network can include the user name, ID, user's real name, e-mail address, user's groups, terminal information, login time, expiration date of login, idle time, and information regarding files and/or directories of the user.

As discussed, in some embodiments, out-of-band data and third party data may be collected and associated with features of one or more domains. For example, out-of-band data such as power level, temperature, physical location may be features of the host domain. As another example, third party information, such as data from a CMDB or CMS may be features of many (if not all) domains, including the network, host, virtualization, process, and user domains.

Feature values may be binary, numeric, categorical, character-based, or other primitive data types. Feature values may also be composites of primitive data types or abstract data types. Feature values may be structured or unstructured.

After collection of the network traffic data, the process 700 may continue on to step 704, in which the network identifies endpoints of the network (e.g., physical servers, VMs, or containers). In an embodiment, these endpoints make up nodes of the application dependency map. In another embodiment, clusters of these endpoints make up the nodes of the application dependency map. In still other embodiments, a combination of these approaches can be implemented. For example, a graphical user interface (GUI) for displaying the application dependency map can enable a user to toggle between a view of the nodes of the application dependency map as clusters or as endpoints. In another embodiment, the GUI can display clusters as a default view and enable the user to drill down into a particular cluster to view the endpoints making up the cluster. Many other graphical representations of the nodes of the application dependency can be implemented in the scope of the various embodiments as will be understood by one of ordinary skill in the art.

At step 706, the network can identify certain configurations within the network, and partition the endpoints based on these configurations. In some embodiments, the network may receive the configuration data, such as from a network operating system, a configuration management system or configuration management database, or other suitable data source. In other embodiments, the network configuration(s) can be ascertained from analysis of the traffic data. For example, some of the traffic patterns and other data related to the traffic may indicate that one or more sets of endpoints of the network form server farms of one or more server load balancers. The network can partition the endpoints based on sets of endpoints can each be defined as separate clusters.

In some embodiments, an application dependency mapping process can be optimized by filtering out endpoints of an SLB server farm from further clustering analysis and/or by representing the server farm using a single fingerprint, signature, or feature vector that encompasses endpoints of the server farm. For instance, the single fingerprint, signature, or feature vector can be a union or an intersection of all unique features of the endpoints making up the server farm, an averaged, percentiled or binned, or weighted average set of values of the features, a selection of the features of one of the endpoints representing a median endpoint of the server farm, or other suitable fusion of features.

As another example, some of the traffic data (e.g., source or destination addresses) may indicate a subnetting schema. As discussed, a cluster cannot include endpoints in different subnets. Thus, a subnet mask can be derived from an IP address of each node upon identification of all nodes identified at step 704. The subnet mask can be used to partition endpoints of the network such that the clustering process is reduced to determining similarities between and among smaller subsets of endpoints instead of determining similarities of each endpoint relative to every other endpoint in the network.

After the endpoints have been partitioned at step 706, respective clusters can be determined for each partition at step 708 based on similarities between and among the respective nodes of each partition Similarity can be a measure of how much alike two nodes are relative to other nodes, or a measure of two nodes being less distant to one another than other nodes. Similarity can be measured according to Euclidean distance, Manhattan distance, Minkowski distance, cosine similarity, or Jaccard similarity, among other similarity or distance functions.

The process 700 may conclude at step 710, in which an application dependency map is generated based on the respective clusterings determined at step 708. For example, each cluster may be represented a node of the application dependency map and the relationships between and among clusters may be represented as edges of the application dependency map.

In some embodiments, the network can present the application dependency map via a graphical user interface (GUI), such as illustrated in FIG. 2A and FIG. 2B. In some embodiments, the GUI may include statistics related to the clusters (e.g., number of nodes, edges, clusters, summaries of changes in clustering from the last ADM run, etc.) and other information for each cluster (e.g., nodes, server ports, and client ports, etc.). In some embodiments, the user interface may also allow the user to edit clusters (e.g., add or modify names and descriptions of clusters, move nodes from one cluster to another, approve an automatically determined cluster). In some embodiments, the user interface can be used to automatically generate application profiles or policies.

Figure 8A:
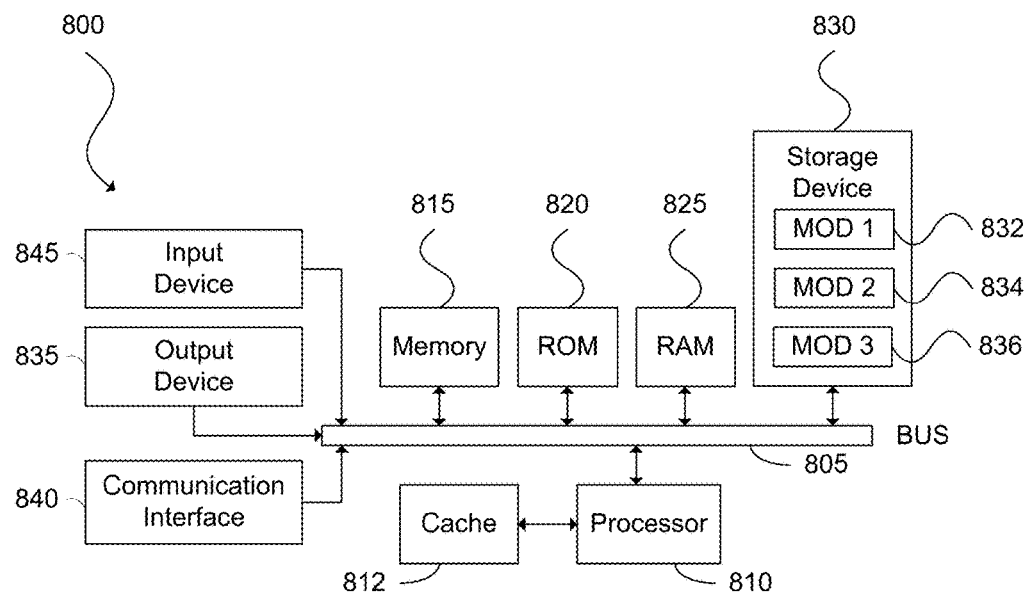
FIG. 8A and FIG. 8B illustrate examples of systems in accordance with some embodiments.
Figure 8B:
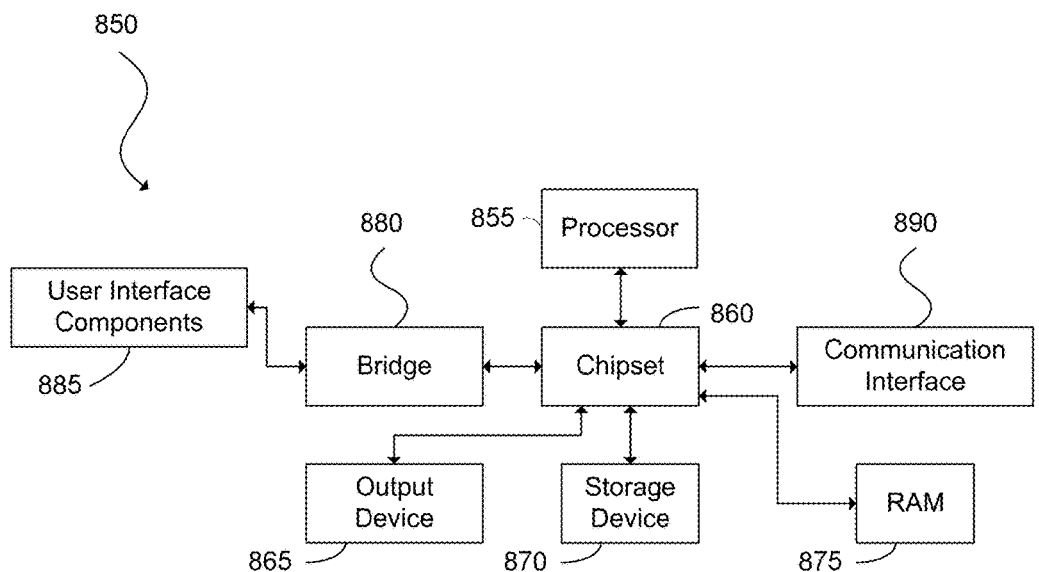

FIG. 8A and FIG. 8B illustrate systems in accordance with various embodiments. The more appropriate system will be apparent to those of ordinary skill in the art when practicing the various embodiments. Persons of ordinary skill in the art will also readily appreciate that other systems are possible.

FIG. 8A illustrates an example architecture for a conventional bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) in a storage device and random access memory (RAM), to the processor 810. The computing system 800 can include a cache 812 of high-speed memory connected directly with, in close proximity to, or integrated as part of the processor 810. The computing system 800 can copy data from the memory 815 and/or the storage device 830 to the cache 812 for quick access by the processor 810. In this way, the cache 812 can provide a performance boost that avoids processor delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

Storage device 830 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, output device 835, and so forth, to carry out the function.

FIG. 8B illustrates an example architecture for a conventional chipset computing system 850 that can be used in accordance with an embodiment. The computing system 850 can include a processor 855, representative of any number of physically and/or logically distinct resources capable of executing software, firmware, and hardware configured to perform identified computations. The processor 855 can communicate with a chipset 860 that can control input to and output from the processor 855. In this example, the chipset 860 can output information to an output device 865, such as a display, and can read and write information to storage device 870, which can include magnetic media, and solid state media, for example. The chipset 860 can also read data from and write data to RAM 875. A bridge 880 for interfacing with a variety of user interface components 885 can be provided for interfacing with the chipset 860. The user interface components 885 can include a keyboard, a microphone, touch detection and processing circuitry, a pointing device, such as a mouse, and so on. Inputs to the computing system 850 can come from any of a variety of sources, machine generated and/or human generated.

The chipset 860 can also interface with one or more communication interfaces 890 that can have different physical interfaces. The communication interfaces 890 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 855 analyzing data stored in the storage device 870 or the RAM 875. Further, the computing system 800 can receive inputs from a user via the user interface components 885 and execute appropriate functions, such as browsing functions by interpreting these inputs using the processor 855.

It will be appreciated that computing systems 800 and 850 can have more than one processor 810 and 855, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
capturing network traffic data for a plurality of flows in a network using a plurality of sensors that includes at least a first sensor on a first physical server of the network, a second sensor on a virtual partition of the network, and a third sensor on a networking device of the network;
determining a plurality of endpoints of the network using the network traffic data;
partitioning the plurality of endpoints into a plurality of partitions based on one or more network configurations, the partitions including a first partition of endpoints for which there has been a user request for application dependency maps, and a second partition of endpoints that communicate with endpoints in the first partition but for which there has not been a user request for application dependency maps;
determining a respective plurality of clusters for each of the plurality of partitions using the network traffic data; and
generating an application dependency map using the respective plurality of clusters.

2. The method of claim 1, wherein the one more network configurations include a load balancing schema, and the method further comprises:
identifying one or more endpoints forming a server farm corresponding to the load balancing schema,
wherein a first partition of the plurality of partitions includes the one or more endpoints.

3. The method of claim 2, further comprising:
analyzing the network traffic data to identify the load balancing schema.

4. The method of claim 3, wherein the network traffic data includes one or more packet attributes of first flows of a first endpoint of the first partition, host attributes of the first endpoint, virtualization attributes of the first endpoint, process attributes of processes initiating the first flows, or user attributes of process owners of the first flows.

5. The method of claim 3, further comprising:
determining a portion of the network traffic data corresponds to a server load balancing algorithm.

6. The method of claim 2, further comprising:
generating a first feature vector representing the first partition using at least one or more first features of a first endpoint of the first partition and one or more second features of a second endpoint of the first partition; and
determining a similarity between the one or more endpoints of the first partition and a third endpoint of the plurality of endpoints using at least the first feature vector and a second feature vector of the third endpoint.

7. The method of claim 1, wherein the one or more network configurations include a subnetting schema, and the method further comprises:

determining a respective subnet mask for each of the plurality of endpoints,
wherein each of the plurality of partitions corresponds to a respective unique subnet mask.

8. The method of claim 7, further comprising:
encoding data corresponding to the respective subnet mask of a first endpoint of the plurality of endpoints as a feature of the first endpoint.

9. The method of claim 1, further comprising:
displaying at least a portion of the application dependency map that corresponds to a first application of the network as a set of clusters corresponding to the first application;
receiving a request for a different view of the portion of the application dependency map that corresponds to the first application; and
displaying the portion as a respective set of endpoints of each cluster of the set of clusters corresponding to the first application.

10. The method of claim 1, further comprising:
displaying at least a portion of the application dependency map that corresponds to a first application of the network as a set of clusters corresponding to the first application;
receiving a selection of a first cluster of the set of clusters; and
displaying a set of endpoints of the first cluster.

11. A system comprising:
a processor; and
memory including instructions that, upon being executed by the processor, cause the system to:
capture network traffic data for a plurality of flows in a network using a plurality of sensors that includes at least a first sensor on a first physical server of the network, a second sensor on a virtual partition of the network, and a third sensor on a networking device of the network;
determine a plurality of endpoints of the network using the network traffic data;
partition the plurality of endpoints into a plurality of partitions based on one or more network configurations, the partitions including a first partition of endpoints for which there has been a user request for application dependency maps, and a second partition of endpoints that communicate with endpoints in the first partition but for which there has not been a user request for application dependency maps;
determine a respective plurality of clusters for each of the plurality of partitions using the network traffic data; and
generate an application dependency map using the respective plurality of clusters.

12. The system of claim 11, wherein the one more network configurations include a load balancing schema, and the instructions upon being executed further cause the system to:
identify one or more endpoints forming a server farm corresponding to the load balancing schema,
wherein a first partition of the plurality of partitions includes the one or more endpoints.

13. The system of claim 12, wherein the instructions upon being executed further cause the system to:
analyze the network traffic data to identify the load balancing schema.

14. The system of claim 13, wherein the network traffic data includes one or more packet attributes of first flows of a first endpoint of the first partition, host attributes of the first endpoint, virtualization attributes of the first endpoint, process attributes of processes initiating the first flows, or user attributes of process owners of the first flows.

15. The system of claim 13, wherein the instructions upon being executed further cause the system to:
determine a portion of the network traffic data corresponds to a server load balancing algorithm.

16. A non-transitory computer-readable medium having computer readable instructions that, upon being executed by a processor, cause the processor to:
capture network traffic data for a plurality of flows in a network using a plurality of sensors that includes at least a first sensor on a first physical server of the network, a second sensor on a virtual partition of the network, and a third sensor on a networking device of the network;
determine a plurality of endpoints of the network using the network traffic data;
partition the plurality of endpoints into a plurality of partitions based on one or more network configurations, the partitions including a first partition of endpoints for which there has been a user request for application dependency maps, and a second partition of endpoints that communicate with endpoints in the first partition but for which there has not been a user request for application dependency maps;
determine a respective plurality of clusters for each of the plurality of partitions using the network traffic data; and
generate an application dependency map using the respective plurality of clusters.

17. The non-transitory computer-readable medium of claim 16, wherein the one or more network configurations include a subnetting schema, and the instructions upon being executed further cause the processor to:
determine a respective subnet mask for each of the plurality of endpoints,
wherein each of the plurality of partitions corresponds to a respective unique subnet mask.

18. The non-transitory computer-readable medium of claim 17, wherein the instructions further cause the processor to:
encode data corresponding to the respective subnet mask of a first endpoint of the plurality of endpoints as a feature of the first endpoint.

19. The non-transitory computer-readable medium of claim 16, wherein the instructions further cause the processor to:
display at least a portion of the application dependency map that corresponds to a first application of the network as a set of clusters corresponding to the first application;
receive a request for a different view of the portion of the application dependency map that corresponds to the first application; and
display the portion as a respective set of endpoints of each cluster of the set of clusters corresponding to the first application.

20. The non-transitory computer-readable medium of claim 16, wherein the instructions further cause the processor to:
   display at least a portion of the application dependency map that corresponds to a first application of the network as a set of clusters corresponding to the first application;
   receive a selection of a first cluster of the set of clusters; and display a set of endpoints of the first cluster.

* * * * *